United States Patent
Rusanovskyy et al.

(10) Patent No.: US 11,336,893 B2
(45) Date of Patent: May 17, 2022

(54) CONTEXT DERIVATION AND ENTROPY CODING INITIALIZATION PARAMETERS FOR COORDINATES OF LAST POSITION CODING IN VIDEO CODING

(71) Applicant: QUALCOMM Incorporated, San Diego, CA (US)

(72) Inventors: Dmytro Rusanovskyy, San Diego, CA (US); Yan Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/142,157

(22) Filed: Jan. 5, 2021

(65) Prior Publication Data
US 2021/0211672 A1    Jul. 8, 2021

Related U.S. Application Data

(60) Provisional application No. 62/958,207, filed on Jan. 7, 2020.

(51) Int. Cl.
*H04N 19/13* (2014.01)
*H04N 19/91* (2014.01)
(Continued)

(52) U.S. Cl.
CPC .......... *H04N 19/13* (2014.11); *H04N 19/176* (2014.11); *H04N 19/42* (2014.11); *H04N 19/91* (2014.11)

(58) Field of Classification Search
CPC ....... H04N 19/13; H04N 19/176; H04N 19/91
See application file for complete search history.

(56) References Cited

U.S. PATENT DOCUMENTS

| 2012/0140813 A1* | 6/2012 | Sole Rojals | H04N 19/70 375/240.02 |
| 2013/0114738 A1* | 5/2013 | Chien | H03M 7/4037 375/240.24 |

(Continued)

FOREIGN PATENT DOCUMENTS

EP    2693752 A1    2/2014

OTHER PUBLICATIONS

Bross B., et al., "Versatile Video Coding (Draft 7)", 16th JVET Meeting, Oct. 1, 2019-Oct. 11, 2019, Geneva, (The Joint Video Exploration Team of ISO/IEC JTC1/SC29/WG11 and ITU-T SG. 16 WP 3), No. JVET-P2001-vE, Nov. 12, 2019 (Nov. 12, 2019), XP030224328, 494 pages, Retrieved from the Internet: URL: http://phenix.int-evry.fr/jvet/doc_end_user/documents/16_Geneva/wg11/JVET-P2001-v14.zip JVET-P2001-vC.docx , [retrieved on Nov. 12, 2019], paragraphs [9.3.3.6], [9.3.3.14].

(Continued)

*Primary Examiner* — Zhubing Ren
(74) *Attorney, Agent, or Firm* — Shumaker & Sieffert, P.A.

(57) ABSTRACT

An example device for coding video data includes a memory configured to store video data; and one or more processors implemented in circuitry and configured to: determine a size of a dimension of a current block of the video data; calculate a context for entropy coding a last significant coefficient coordinate along the dimension, wherein to calculate the context, the one or more processors are configured to: calculate a context shift value according to ((log 2TrafoSize+1)>>2)<<1, wherein log 2TrafoSize represents a logarithmic value of the size of the dimension, '>>' represents a bitwise right shift operator, and '<<' represents a bitwise left shift operator; and calculate the context using the context (Continued)

shift value; and entropy code the last significant coefficient coordinate using the calculated context.

47 Claims, 10 Drawing Sheets

(51) Int. Cl.
*H04N 19/42* (2014.01)
*H04N 19/176* (2014.01)

(56) References Cited

U.S. PATENT DOCUMENTS

| | | | |
|---|---|---|---|
| 2013/0202026 A1 | 8/2013 | Fang et al. | |
| 2013/0251041 A1* | 9/2013 | Guo | H04N 19/513 375/240.16 |
| 2016/0080742 A1* | 3/2016 | Kirchhoffer | H04N 19/124 375/240.07 |
| 2020/0322640 A1 | 10/2020 | Rusanovskyy et al. | |

OTHER PUBLICATIONS

Choi K., et al., "Text of ISO/IEC CD 23094-1, Essential Video Coding", Coding of Moving Pictures and Audio, (Motion Picture Expert Group or ISO/IEC JTC1/SC29/WG11), No. N18568, Gothenburg, Sweden, Jul. 22, 2019, XP030221847, 292 Pages, Retrieved from the Internet: URL:http://phenix.int-evry.fr/mpeg/doc_end_user/documents/127_Gothenburg/wg11/w18568.zip w18568.docx [retrieved on Jul. 28, 2019] Sections 7.3.2.1, 7 3.2.2, 7.3.4.
Choi K., et al., "Text of ISO/IEC DIS 23094-1, Essential Video Coding", 128th MPEG Meeting, Oct. 7, 2019-Oct. 11, 2019, Geneva, (Motion Picture Expert Group or ISO/IEC JTC1/SC29/WG11), No. N18774, Nov. 6, 2019 (Nov. 6, 2019), XP030225506, 305 pages, Retrieved from the Internet:URL:http://phenix.int-evry.fr/mpeg/doc_end_user/documents/128_Geneva/wg11/w18774.zip w18774_Text_DIS_23094-1_draft_final_v3.docx [retrieved on Nov. 6, 2019] p. 243, paragraph 9.3.4.2.6.
International Search Report and Written Opinion—PCT/US2021/012310—ISA/EPO—dated Mar. 10, 2021.
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.
Zhang Y., et al., "[EVC] Suggested Improvements for EVC Specification and Test Model", ISO/IEC JTC1/SC29/WG11 MPEG2019/M52290, Coding of Moving Pictures and Audio, Brussels, Belgium, Jan. 2019, 4 pages.

* cited by examiner

CONTEXT DERIVATION AND ENTROPY CODING INITIALIZATION PARAMETERS FOR COORDINATES OF LAST POSITION CODING IN VIDEO CODING

This application claims the benefit of U.S. Provisional Application No. 62/958,207 filed Jan. 7, 2020, the entire content of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for context-adaptive entropy coding for syntax elements that indicate the last significant coefficient position (last position) in a block of transform coefficients. The transform coefficients may be quantized transform coefficients produced by applying a transform to residual values representing differences between samples of an original block of video data and a predicted block of video data. In some examples, the transform coefficients may be quantized transform coefficients. The last position in the block of transform coefficients is the position in the block, in x and y coordinates, of the last non-zero (e.g., significant) transform coefficient in the block along a scanning order. For a bin of a last position to be encoded, the index of the context-adaptive entropy coding context for the bin is derived using a function, such that a mapping table between last position bins and context-adaptive entropy contexts can be saved. The techniques of this disclosure may ensure that contexts for each bin are unique, and that the number of possible contexts is reduced. In this manner, these techniques may reduce a number of computations needed to perform entropy coding and may improve performance of the entropy coding process.

In one example, a method of decoding video data includes determining a size of a dimension of a current block of video data; calculating a context for entropy decoding a last significant coefficient coordinate along the dimension, wherein calculating the context comprises: calculating a context shift value according to ((log 2TrafoSize+1)>>2)<<1, wherein log 2TrafoSize represents a logarithmic value of the size of the dimension, '>>' represents a bitwise right shift operator, and '<<' represents a bitwise left shift operator; and calculating the context using the context shift value; and entropy decoding the last significant coefficient coordinate using the calculated context.

In another example, a device for decoding video data includes a memory configured to store video data; and one or more processors implemented in circuitry and configured to: determine a size of a dimension of a current block of the video data; calculate a context for entropy decoding a last significant coefficient coordinate along the dimension, wherein to calculate the context, the one or more processors are configured to: calculate a context shift value according to ((log 2TrafoSize+1)>>2)<<1, wherein log 2TrafoSize represents a logarithmic value of the size of the dimension, '>>' represents a bitwise right shift operator, and '<<' represents a bitwise left shift operator; and calculate the context using the context shift value; and entropy decode the last significant coefficient coordinate using the calculated context.

In another example, a computer-readable storage medium has stored thereon instructions that, when executed, cause a processor to determine a size of a dimension of a current block of video data; calculate a context for entropy decoding a last significant coefficient coordinate along the dimension, wherein the instructions that cause the processor to calculate the context comprise instructions that cause the processor to: calculate a context shift value according to ((log 2TrafoSize+1)>>2)<<1, wherein log 2TrafoSize represents a logarithmic value of the size of the dimension, '>>' represents a bitwise right shift operator, and '<<' represents a bitwise left shift operator; and calculate the context using the context shift value; and entropy decode the last significant coefficient coordinate using the calculated context.

In another example, a method of encoding video data includes determining a size of a dimension of a current block of video data; calculating a context for entropy encoding a last significant coefficient coordinate along the dimension, wherein calculating the context comprises: calculating a context shift value according to ((log 2TrafoSize+1)>>2)<<1, wherein log 2TrafoSize represents a logarithmic value of the size of the dimension, '>>' represents a bitwise right shift operator, and '<<' represents a bitwise left shift operator; and calculating the context using the context shift value; and entropy encoding the last significant coefficient coordinate using the calculated context.

In another example, a device for encoding video data includes a memory configured to store video data; and one or more processors implemented in circuitry and configured to: determine a size of a dimension of a current block of the video data; calculate a context for entropy encoding a last significant coefficient coordinate along the dimension, wherein to calculate the context, the one or more processors are configured to: calculate a context shift value according to $((\log 2\text{TrafoSize}+1)\gg 2)\ll 1$, wherein $\log 2\text{TrafoSize}$ represents a logarithmic value of the size of the dimension, '>>' represents a bitwise right shift operator, and '<<' represents a bitwise left shift operator; and calculate the context using the context shift value; and entropy encode the last significant coefficient coordinate using the calculated context.

In another example, a computer-readable storage medium has stored thereon instructions that, when executed, cause a processor to determine a size of a dimension of a current block of video data; calculate a context for entropy encoding a last significant coefficient coordinate along the dimension, wherein the instructions that cause the processor to calculate the context comprise instructions that cause the processor to: calculate a context shift value according to $((\log 2\text{TrafoSize}+1)\gg 2)\ll 1$, wherein $\log 2\text{TrafoSize}$ represents a logarithmic value of the size of the dimension, '>>' represents a bitwise right shift operator, and '<<' represents a bitwise left shift operator; and calculate the context using the context shift value; and entropy encode the last significant coefficient coordinate using the calculated context.

The details of one or more examples are set forth in the accompanying drawings and the description below. Other features, objects, and advantages will be apparent from the description, drawings, and claims.

DETAILED DESCRIPTION

When coding video data, a video coder (encoder or decoder) may use context-adaptive binary arithmetic coding (CABAC) or other entropy coding techniques. In general, CABAC includes the use of various contexts for coding particular values of syntax elements (e.g., individual bins of the values). This disclosure recognizes that having distinct contexts for each bin may be beneficial, because the contexts can be optimized for the particular bin. However, in some conventional techniques, contexts have been reused between different bins of values for certain syntax elements. Thus, this disclosure describes techniques that may be used to assign individual, distinct contexts to bins of values for various syntax elements, which may allow for improved optimization of the context assignments. This may, thereby, improve the overall coding of video data, in that the size of a bitstream may be reduced without impacting video quality and without overly increasing processing requirements of the video coder.

Figure 1:
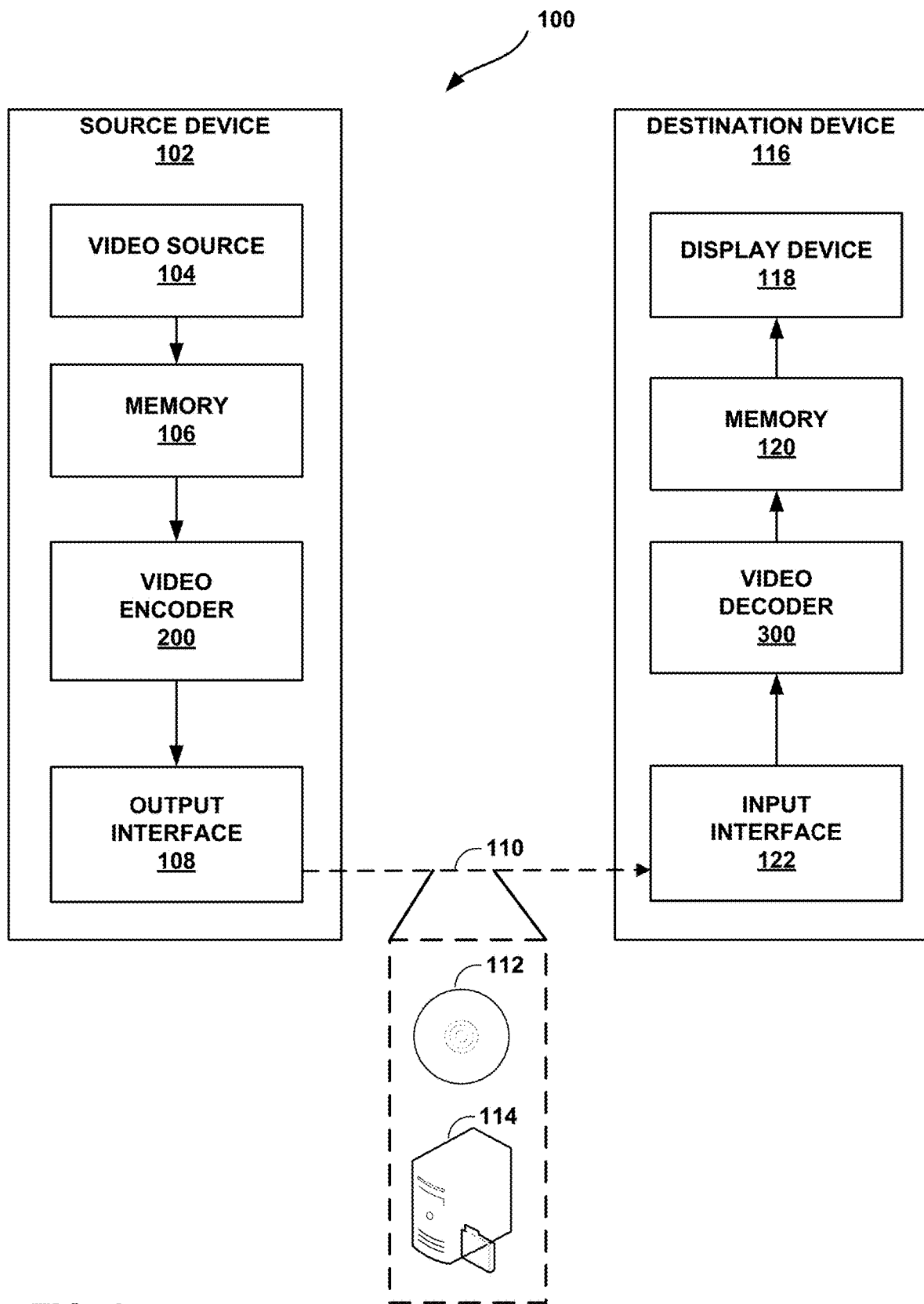
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for context derivation for the position of a last significant coefficient. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for context derivation for the position of a last significant coefficient. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard. Example video coding standards include ITU-T H.265, also referred to as High Efficiency Video Coding (HEVC). Other example standards include the Joint Exploration Test Model (JEM) or ITU-T H.266, also referred to as Versatile Video Coding (VVC). A recent draft of the VVC standard is described in Bross, et al. "Versatile Video Coding (Draft 7)," Joint Video Experts Team (WET) of ITU-T SG 16 WP 3 and ISO/IEC JTC 1/SC 29/WG 11, 16$^{th}$ Meeting: Geneva, CH, 1-11 Oct. 2019, JVET-P2001-v14 (hereinafter "VVC Draft 7"). The techniques of this disclosure, however, are not limited to any particular coding standard. In some examples, video encoder 200 and video decoder 300 may operate according to the MPEG-5 Essential Video Coding (EVC) standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC and some examples of EVC and VVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to a multi-type tree (MTT) partitioning structure, where blocks may be partitioned using one or more of a quadtree (QT) partition, a binary tree (BT) partition, and one or more types of triple tree (TT) (also called ternary tree (TT) or binary ternary tree (BTT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single quadtree binary tree (QTBT) or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC and/or EVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The following description will use the term CUs, though it should be understood that other terms may be used for block upon which a prediction process is performed. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some example techniques also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples video codecs provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

This disclosure describes techniques by which video encoder 200 may determine contexts for entropy encoding certain transform coefficient values. In particular, when encoding transform coefficients, video encoder 200 may encode significant coefficient flags representing whether respective coefficients are "significant," i.e., have an absolute value greater than 0. For the significant coefficients, video encoder 200 may further encode a sign value and a level value. The sign value may indicate a sign of the level (i.e., whether the level is greater than or less than zero). The level value may represent an actual absolute value of the transform coefficient. Video encoder 200 may entropy encode the level value using, for example, an indication of whether the absolute level value is greater than 1, greater than 2, and a remaining level value.

In this manner, video encoder 200 may avoid encoding sign and level values for non-significant transform coefficients. Video encoder 200 may also avoid encoding greater than 2 and remaining absolute level values for transform coefficients having absolute level values that are not greater than 1. Furthermore, video encoder 200 may avoid encoding remaining absolute level values for transform coefficients having absolute level values that are not greater than 2.

Furthermore, video encoder 200 may entropy encode a last significant coefficient position value, representing a position (location) of the last significant coefficient in a scan order of the corresponding transform block. In this manner, video encoder 200 may avoid entropy encoding data for transform coefficients following the last significant coefficient. In particular, video encoder 200 may separately encode the last significant coefficient position by separately entropy encoding x- and y-coordinates of the last significant position value in the block. Video encoder 200 may determine a context for encoding each coordinate according to a size of a corresponding dimension of the transform block. For example, for the x-coordinate, video encoder 200 may determine the context according to a width of the transform block, whereas for the y-coordinate, video encoder 200 may determine the context according to a height of the transform block.

As discussed in greater detail below, in some examples, video encoder 200 may determine the context for coding each coordinate using a corresponding context shift value. Video encoder 200 may calculate the context shift value according to, e.g., ((log 2TrafoSize+1)>>2)<<1, where log 2TrafoSize is a logarithmic value representative of the corresponding dimension (width or height) of the transform block for the coordinate (x or y, respectively), << is a bitwise left shift operator, and >> is a bitwise right shift operator. In particular, video encoder 200 may entropy encode the values of the coordinates in two parts: a prefix value and a remaining (or suffix) value. Video encoder 200 may entropy encode the prefix value using the determined context, and the remaining (or suffix) value using bypass coding.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

Video decoder 300 may entropy decode transform coefficients of a transform block in a manner substantially similar to the inverse of the process discussed above with respect to video encoder 200. For example, video decoder 300 may entropy decode transform coefficient data including a last significant coefficient position in scan order, significant coefficient flags, sign values for the significant coefficients, and absolute level values (e.g., greater than 1, greater than 2, and remainder values) for the significant coefficients. Again, video decoder 300 may be configured to avoid decoding data for transform coefficients beyond the last significant coefficient position in scan order.

Moreover, video decoder 300 may use the techniques of this disclosure to determine contexts for decoding coordinates of the last significant coefficient position. As described above, video decoder 300 may determine the contexts according to a size of a dimension corresponding to the coordinates, e.g., a width for the x-coordinate and a height for the y-coordinate. Video decoder 300 may also determine contexts for entropy decoding prefix values of the coordinates, and decode remaining (suffix) values of the coordinates using bypass decoding. Video decoder 300 may concatenate the prefix and remaining values for a given coordinate to determine the value of the coordinate. After determining both the x- and y-coordinates of the last significant coefficient position, video decoder 300 may determine that no data will be received in the bitstream for transform coefficients of the block following the last significant coefficient. Thus, video decoder 300 may infer values of 0 for each of the transform coefficients following the last significant coefficient.

In accordance with certain examples of the techniques of this disclosure, video encoder 200 and video decoder 300 may be configured to determine contexts for bins of a prefix of a last significant coefficient position syntax element for a 64×64 transform unit, wherein a total number of contexts for the bins of the prefix includes only three separate contexts, and entropy code the bins of the prefix of the last significant coefficient position syntax element based on the determined contexts.

The residual information may be represented by, for example, quantized transform coefficients. Video decoder 300 may inverse quantize and inverse transform the quantized transform coefficients of the transform block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
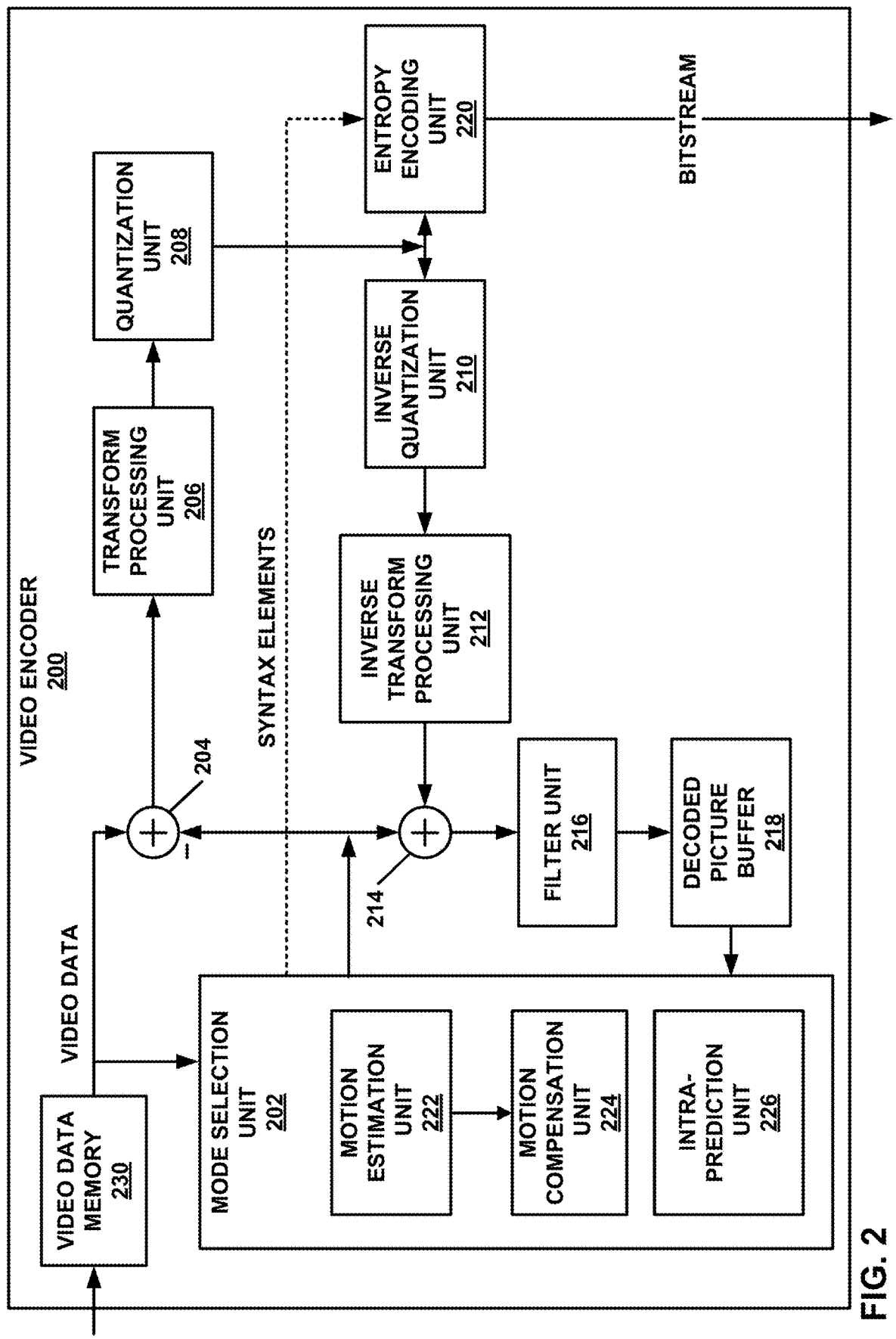
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of EVC (MPEG-5), JEM, VVC (ITU-T H.266), or HEVC (ITU-T H.265). However, the techniques of this disclosure may be performed by video encoding devices that are configured to other video coding standards.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as a QT structure, a QTBT structure, or other tree structure. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples that neighbor the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generates syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Entropy encoding unit 220 may entropy encode quantized transform coefficients (referred to herein for brevity simply as "transform coefficients") of a transform block according to the techniques of this disclosure. For example, entropy encoding unit 220 may determine which of the transform coefficients is significant, i.e., has an absolute value greater than 0.

Entropy encoding unit 220 may determine a last significant coefficient in a scan order (e.g., zig zag, horizontal, vertical, diagonal, or other scan orders) and encode data representing a position of the last significant coefficient in the scan order. As discussed above, entropy encoding unit 220 may determine an x-coordinate and a y-coordinate of the last significant coefficient position in the transform block. Entropy encoding unit 220 may partition these coordinate values into respective prefix and suffix values (e.g., last_sig_coeff_x_prefix, last_sig_coeff_y_prefix, last_sig_coeff_x_suffix, and last_sig_coeff_y_suffix). Entropy encoding unit 220 may entropy encode the prefix values using respective context coding and encode the suffix values using bypass coding.

In one example, entropy encoding unit 220 entropy encodes the prefix values using contexts determined according to lengths of corresponding dimensions of the transform block. The transform block may be square or non-square, and therefore, the height and width of the transform block need not necessarily be equal. Entropy encoding unit 220 may determine a context for entropy encoding the x-coordinate prefix using a width of the transform block and a context for entropy encoding the y-coordinate prefix using a height of the transform block. For example, entropy encoding unit 220 may determine a context shift value according to ((log 2TrafoSize+1)>>2)<<1, where log 2TrafoSize represents a logarithmic representation of the size of the corresponding dimension (width or height) of the transform block. Entropy encoding unit 220 may then determine contexts for entropy encoding bins of the prefix values using the respective context shift value.

After entropy encoding the data representing the location of the last significant coefficient position (the x- and y-coordinates), entropy encoding unit 220 may entropy encode significant coefficient flags for the transform coefficients up to the last significant coefficient. For the significant transform coefficients (i.e., transform coefficients having absolute values greater than zero), entropy encoding unit 220 may entropy encode data representing signs of the transform coefficients and data representing absolute values of the levels. Entropy encoding unit 220 may avoid encoding any data for transform coefficients beyond the last significant coefficient in scan order, because these transform coefficients can be inferred to have values equal to zero.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine contexts for bins of a prefix of a last significant coefficient position syntax element for a 64×64 transform unit, wherein a total number of contexts for the bins of the prefix includes only three separate contexts, and entropy code the bins of the prefix of the last significant coefficient position syntax element based on the determined contexts.

Video encoder 200 also represents an example of a device for encoding video data that includes a memory configured to store video data; and one or more processors implemented in circuitry and configured to: determine a size of a dimension of a current block of the video data; calculate a context for entropy encoding a last significant coefficient coordinate along the dimension, wherein to calculate the context, the one or more processors are configured to: calculate a context shift value according to $((\log 2\text{TrafoSize}+1)>>2)<<1$, wherein log 2TrafoSize represents a logarithmic value of the size of the dimension, '>>' represents a bitwise right shift operator, and '<<' represents a bitwise left shift operator; and calculate the context using the context shift value; and entropy encode the last significant coefficient coordinate using the calculated context.

Figure 3:
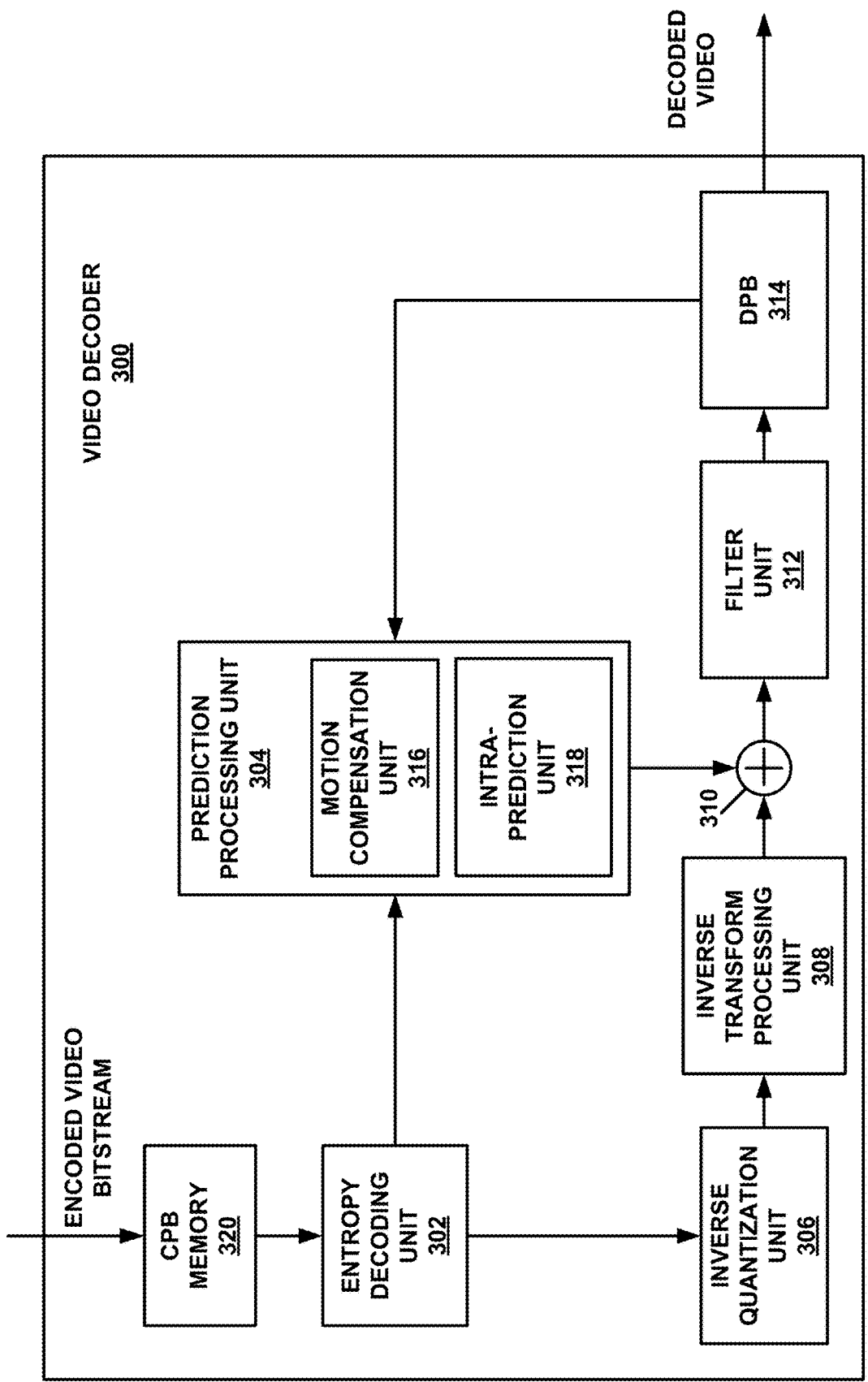
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of EVC (MPEG-5), JEM, VVC (ITU-T H.266), or HEVC (ITU-T H.265). However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s).

Entropy decoding unit 302 may entropy decode quantized transform coefficients (referred to herein for brevity simply as "transform coefficients") of a transform block according to the techniques of this disclosure. For example, entropy decoding unit 302 may initially determine a last significant coefficient in a scan order (e.g., zig zag, horizontal, vertical, diagonal, or other scan orders) and decode data representing a position of the last significant coefficient in the scan order. As discussed above, entropy decoding unit 302 may entropy decode data representing an x-coordinate and a y-coordinate of the last significant coefficient position in the transform block. Entropy decoding unit 302 may separately entropy decode respective prefix and suffix values (e.g., last_sig_coeff_x_prefix, last_sig_coeff_y_prefix, last_sig_coeff_x_suffix, and last_sig_coeff_y_suffix). Entropy decoding unit 302 may concatenate the corresponding prefix and suffix values to fully reproduce the x- and y-coordinates of the last significant coefficient in the transform block.

In one example, entropy decoding unit 302 entropy decodes the prefix values using contexts determined according to lengths of corresponding dimensions of the transform block. The transform block may be square or non-square, and therefore, the height and width of the transform block need not necessarily be equal. Entropy decoding unit 302 may determine a context for entropy decoding the x-coordinate prefix using a width of the transform block and a context for entropy decoding the y-coordinate prefix using a height of the transform block. For example, entropy decoding unit 302 may determine a context shift value according to ((log 2TrafoSize+1)>>2)<<1, where log 2TrafoSize represents a logarithmic representation of the size of the corresponding dimension (width or height) of the transform block. Entropy decoding unit 302 may then determine contexts for entropy decoding bins of the prefix values using the respective context shift value.

After determining the location of the last significant coefficient, entropy decoding unit 302 may set values of transform coefficients following the last significant coefficient equal to zero and avoid attempting to process any data of the bitstream for these transform coefficients. For other transform coefficients occurring up to the last significant coefficient, entropy decoding unit 302 may entropy decode significant coefficient flags. For the significant transform coefficients (i.e., transform coefficients having absolute values greater than zero), entropy decoding unit 302 may entropy decode data representing signs of the transform coefficients and data representing absolute values of the levels. After decoding this data, entropy decoding unit 302 may reconstruct the quantized transform values of the transform coefficients in the quantized transform coefficient block.

Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine contexts for bins of a prefix of a last significant coefficient position syntax element for a 64×64 transform unit, wherein a total number of contexts for the bins of the prefix includes only three separate contexts, and entropy code the bins of the prefix of the last significant coefficient position syntax element based on the determined contexts.

Video decoder 300 also represents an example of a device for decoding video data that includes a memory configured to store video data; and one or more processors implemented in circuitry and configured to: determine a size of a dimension of a current block of the video data; calculate a context for entropy decoding a last significant coefficient coordinate along the dimension, wherein to calculate the context, the one or more processors are configured to: calculate a context shift value according to ((log 2TrafoSize+1)>>2)<<1, wherein log 2TrafoSize represents a logarithmic value of the size of the dimension, '>>' represents a bitwise right shift operator, and '<<' represents a bitwise left shift operator; and calculate the context using the context shift value; and entropy decode the last significant coefficient coordinate using the calculated context.

In general, this disclosure describes techniques for context-adaptive entropy coding for syntax elements that indicate the last significant coefficient position (last position) in a block of transform coefficients. The last position is the position in the block, in x and y coordinates, of the last non-zero (e.g., significant) transform coefficient in the block along a scanning order. For a bin of a last position to be encoded, the index of the context-adaptive entropy context for the bin is derived using a function, such that a mapping table between last position bins and context-adaptive entropy contexts can be saved. The techniques of this disclosure may be used in the MPEG-5 EVC standard or may be used in conjunction with other video coding techniques.

The following is a brief introduction to example techniques for encoding a syntax element that indicates the last position (e.g., the position of the last significant coefficient). The following techniques are similar to those used in HEVC and example versions of EVC. In one example, the encoding includes two parts: binarization and CABAC encoding. The binarization process converts the location (position) of the last significant coefficient to a binary string. In one example, the binarization is truncated unary encoding plus fixed-length encoding. For the truncated unary code part, the bins are encoded using CABAC contexts. For the fixed length part, the bins are encoded using bypass mode (e.g., without contexts). An example of a binarization for a 32×32 TU (transform unit/transform block) is shown in Table I.

TABLE I

Binarization for 32 × 32 TU

| Magnitude of last position component | Truncated unary (context model) | Fixed binary (bypass) | f_value |
|---|---|---|---|
| 0 | 1 | — | 0 |
| 1 | 01 | — | 0 |
| 2 | 001 | — | 0 |
| 3 | 0001 | — | 0 |
| 4-5 | 00001 | X | 0-1 |
| 6-7 | 000001 | X | 0-1 |
| 8-11 | 0000001 | XX | 0-3 |
| 12-15 | 00000001 | XX | 0-3 |
| 16-23 | 000000001 | XXX | 0-7 |
| 24-31 | 000000000 | XXX | 0-7 |

Examples of the context index (ctxInc) for a prefix syntax element from HEVC clause 9.3.4.2.3 are defined below. Note that last_sig_coeff_x_prefix is the prefix of the X position of the last significant coefficient and that last_sig_coeff_y_prefix is the prefix of the Y position of the last significant coefficient.

1.1 Derivation Process of ctxInc for the Syntax Elements last_sig_coeff_x_prefix and last_sig_coeff_y_prefix Inputs to this process are the variable binIdx, the colour component index cIdx and the transform block size log 2TrafoSize.

Output of this process is the variable ctxInc.

The variables ctxOffset and ctxShift are derived as follows:

If cIdx is equal to 0, ctxOffset is set equal to 3*(log 2TrafoSize−2)+((log 2TrafoSize−1)>>2) and ctxShift is set equal to (log 2TrafoSize+1)>>2.

Otherwise (cIdx is greater than 0), ctxOffset is set equal to 15 and ctxShift is set equal to log 2TrafoSize−2.

The variable ctxInc is derived as follows:

$$ctxInc=(binIdx>>ctxShift)+ctxOffset \quad (9\text{-}25)$$

Which effectively results in the following derivation results in Table II:

TABLE II

Luma last_significant_coeff_X_prefix
Context assignment (Setting A)

| Bin index | 0 | 1 | 2 | 3 | 4 | 5 | 6 | 7 | 8 |
|---|---|---|---|---|---|---|---|---|---|
| TU 4 × 4 | 0 | 1 | 2 | | | | | | |
| TU 8 × 8 | 3 | 3 | 4 | 4 | 5 | | | | |
| TU 16 × 16 | 6 | 6 | 7 | 7 | 8 | 8 | 9 | | |
| TU 32 × 32 | 10 | 10 | 11 | 11 | 12 | 12 | 13 | 13 | 14 |

However, with introduction of the large transform sizes in next generation video codecs, the equation specified above does not provide a consistent pattern for transform sizes larger than 32. Table III below shows examples of unintentionally shared context indices (shown in bold and italics) between different bins. This effectively may result in inefficiency of the context adaptivity.

TABLE III

Luma last_significant_coeff_X_prefix Context assignment
(note complete binarization for TU64 × 64)

| Bin index | 0 | 1 | 2 | 3 | 4 | 5 | 6 | 7 | 8 |
|---|---|---|---|---|---|---|---|---|---|
| TU 4 × 4 | 0 | 1 | 2 | | | | | | |
| TU 8 × 8 | 3 | 3 | 4 | 4 | 5 | | | | |
| TU 16 × 16 | 6 | 6 | 7 | 7 | 8 | 8 | 9 | | |
| TU 32 × 32 | 10 | 10 | 11 | 11 | 12 | 12 | *13* | *13* | *14* |
| TU 64 × 64 | *13* | *13* | *14* | *14* | 15 | 15 | 16 | 16 | 17 |

Another example of deriving contexts for the last_sig_coeff_x_prefix and last_sig_coeff_y_prefix is shown below.

1.2 Derivation Process of ctxInc for the Syntax Elements last_sig_coeff_x_prefix and last_sig_coeff_y_prefix Inputs to this process are the variable binIdx, the colour component index cIdx and the transform block size log 2TrafoSize.

Output of this process is the variable ctxInc.

If cIdx is equal to 0, the variables ctxOffset and ctxShift are derived as follows:

If log 2TrafoSize X is less than or equal to 5 ctxOffset is set equal to 3*(log 2TrafoSizeX−2)+((log 2TrafoSizeX−1)>>2) and ctxShift is set equal to (log 2TrafoSizeX+1)>>2 with variable log 2TrafoSizeX being equal to log 2TrafoSizeWidth for derivation of context for sig_coeff_x_prefix and equal to log 2TrafoSizeHeight for derivation of context for sig_coef_y_prefix.

Otherwise (if log 2TrafoSizeX is greater than 5) ctxOffset is set equal to 3*(log 2TrafoSizeX−2)+((log 2TrafoSizeX−1)>>2)+((TrafoSizeX>>6)<<1)+(TrafoSizeX>>7) and ctxShift is set equal to (log 2TrafoSizeX+1)>>2 with variable log 2TrafoSizeX being equal to log 2TrafoSizeWidth for derivation of context for sig_coeff_x_prefix and equal to log 2TrafoSizeHeight for derivation of context for sig_coef_y_prefix.

Otherwise (cIdx is greater than 0), ctxOffset is set equal to 25 and ctxShift is set equal to log 2TrafoSizeX−2−log 2(TrafoSizeX>>4) with variable TrafoSizeX being equal to TrafoSizeWidth for sig_coeff_x_prefix and equal to TrafoSizeHeight for sig_coef_y_prefix.

Table IV below shows a fragment of context indices for block sizes (incomplete results for TU64) without sharing context indices of different bins.

TABLE IV

Luma last_significant_coeff_X_prefix
Context assignment (Setting A)

| Bin index | 0 | 1 | 2 | 3 | 4 | 5 | 6 | 7 | 8 |
|---|---|---|---|---|---|---|---|---|---|
| TU 4 × 4 | 0 | 1 | 2 | | | | | | |
| TU 8 × 8 | 3 | 3 | 4 | 4 | 5 | | | | |
| TU 16 × 16 | 6 | 6 | 7 | 7 | 8 | 8 | 9 | | |
| TU 32 × 32 | 10 | 10 | 11 | 11 | 12 | 12 | 13 | 13 | 14 |
| TU 64 × 64 | 15 | 15 | 16 | 16 | 17 | 17 | 18 | 18 | 19 |

1.3 Alternative Examples

In another example, context derivation of the last positions can be implemented as follows:

If cIdx is equal to 0, the variables ctxOffset and ctxShift are derived as follows:

If log 2TrafoSizeX is less than or equal to 5 ctxOffset is set equal to 3*(log 2TrafoSizeX-2)+((log 2TrafoSizeX-1)>>2) and ctxShift is set equal to (log 2TrafoSizeX+1)>>2 with variable log 2TrafoSizeX being equal to log 2TrafoSizeWidth for derivation of context for sig_coeff_x_prefix and equal to log 2TrafoSizeHeight for derivation of context for sig_coef_y_prefix.

Otherwise (if log 2TrafoSizeX is equal to 6) ctxOffset is set equal to 3*(log 2TrafoSizeX-2)+((log 2TrafoSizeX-1)>>2)+2 and ctxShift is set equal to (log 2TrafoSizeX+1)>>2 with variable log 2TrafoSizeX being equal to log 2TrafoSizeWidth for derivation of context for sig_coeff_x_prefix and equal to log 2TrafoSizeHeight for derivation of context for sig_coef_y_prefix.

Otherwise (if log 2TrafoSizeX is equal to 7) ctxOffset is set equal to 3*(log 2TrafoSizeX-2)+((log 2TrafoSizeX-1)>>2)+5 and ctxShift is set equal to (log 2TrafoSizeX+1)>>2 with variable log 2TrafoSizeX being equal to log 2TrafoSizeWidth for derivation of context for sig_coeff_x_prefix and equal to log 2TrafoSizeHeight for derivation of context for sig_coef_y_prefix.

Otherwise (cIdx is greater than 0), ctxOffset is set equal to 25 and ctxShift is set equal to log 2TrafoSizeX-2-log 2(TrafoSizeX>>4) with variable TrafoSizeX being equal to TrafoSizeWidth for derivation of context for sig_coeff_x_prefix and equal to TrafoSizeHeight for derivation of context for sig_coef_y_prefix.

1.4 Alternative Example Pseudocode

In some embodiments, implementation can be conducted with the following pseudocode:

```
int convertedWidth=CONV_LOG 2(width)-2;
int convertedHeight=CONV_LOG 2(height)-2;
convertedWidth=(convertedWidth<0) ? 0:convertedWidth;
convertedHeight=(convertedHeight<0) ? 0:convertedHeight;
*result_offset_x=(ch_type !=Y_C) ? 0:((convertedWidth*3)+((convertedWidth+1)>>2));
*result_offset_y=(ch_type !=Y_C) ? 0:((convertedHeight*3)+((convertedHeight+1)>>2));
*result_shift_x=(ch_type !=Y_C) ? convertedWidth-CONV_LOG 2(width>>4):((convertedWidth+3)>>2);
*result_shift_y=(ch_type !=Y_C) ? convertedHeight-CONV_LOG 2(height>>4):((convertedHeight+3)>>2);
if (ch_type == Y_C)
{
    if (convertedWidth >= 4)
    {
        *result_offset_x += ((width >> 6) << 1) + (width >> 7);
    }
    if (convertedHeight >= 4)
    {
        *result_offset_y += ((height >> 6) << 1) + (height >> 7);
    }
} const int g_group_idx[MAX_TR_SIZE]=
{0,1,2,3,4,4,5,5,6,6,6,6,7,7,7,7,8,8,8,8,8,8,8,8,9,9,9,9,9,9,9,9,
9,10,10,10,10,10,10,10,10,1 0,10,10,10,10,10,10,10,11,11,
11,11,11,11,11,11,11,11,11,11,11,11,11,11,12,12,12,12,1
2,12,12,12,12,12,12,12,12,12,12,12,12,12,12,12,12,12,12,
12,12,12,12,12,12,12,12,12,1 3,13,13,13,13,13,13,13,13,13,
13,13,13,13,13,13,13,13,13,13,13,13,13,13,13,13,13,13,1
3,13,13,13};
```

A bin-specific index for the x coordinate may be derived as follows:

```
Context_indx = ctx_base + cm_x + blk_offset_x + (pos_x >> shift_x);
for (pos_x = 0; pos_x < g_group_idx[width - 1]; pos_x++)
{
    last = evcd_sbac_decode_bin(bs, sbac,Context_index);
    if (!last)
    {
        break;
    }
}
```

TABLE V

Example Contexts

| Bin: | 0 | 1 | 2 | 3 | 4 | 5 | 6 | 7 | 8 | 9 | 10 | 11 | 12 |
|---|---|---|---|---|---|---|---|---|---|---|---|---|---|
| Luma: | | | | | | | | | | | | | |
| TU2 | 0 | | | | | | | | | | | | |
| TU4 | 0 | 1 | 2 | | | | | | | | | | |
| TU8 | 3 | 3 | 4 | 4 | 5 | | | | | | | | |
| TU16 | 6 | 6 | 7 | 7 | 8 | | | | | | | | |
| TU32 | 10 | 10 | 11 | 11 | 12 | 12 | 13 | 13 | 14 | | | | |
| TU64 | 15 | 15 | 16 | 16 | 17 | 17 | 18 | 18 | 19 | 19 | 20 | | |
| TU128 | 21 | 21 | 21 | 21 | 22 | 22 | 22 | 22 | 23 | 23 | 23 | 23 | 24 |
| Chroma: | | | | | | | | | | | | | |
| TU2 | 25 | | | | | | | | | | | | |
| TU4 | 25 | 26 | 27 | | | | | | | | | | |
| TU8 | 25 | 25 | 26 | 26 | 27 | | | | | | | | |
| TU16 | 25 | 25 | 25 | 25 | 26 | 26 | 26 | | | | | | |
| TU32 | 25 | 25 | 25 | 25 | 26 | 26 | 26 | 26 | 27 | | | | |
| TU64 | 25 | 25 | 25 | 25 | 26 | 26 | 26 | 26 | 27 | 27 | 27 | | |
| TU128 | 25 | 25 | 25 | 25 | 26 | 26 | 26 | 26 | 27 | 27 | 27 | 27 | 28 |

The context derivation model presented in section 1.2 above uses 20 total context entries to cover the full range of possible X and Y values for a transform length up to 64 (e.g., a 64×64 TU). This disclosure presents techniques that reduce the number of required context indices for the transform length of 64 as shown below in section 2.1. Changes relative to previous techniques are shown between the tags <ADD> and </ADD>.

2.1 Context Reduction Method:

2.1.1.1.1 Derivation Process of ctxInc for the Syntax Elements last_sig_coeff_x_prefix and last_sig_coeff_y_prefix Inputs to this process are the variable binIdx, the colour component index cIdx and the associated transform size log 2TrafoSize which is log 2TbWidth for last_sig_coeff_x_prefix and log 2TbHeight for last_sig_coeff_y_prefix, respectively.
Output of this process is the variable ctxInc.
The variables ctxOffset and ctxShift are derived as follows:
 If cIdx is equal to 0, ctxOffset is set equal to 3*(log 2TrafoSize−2)+((log 2TrafoSize−1)>>2) and ctxShift is set equal to (log 2TrafoSize+1)>>2.
 Otherwise (if log 2TrafoSize is greater than 5), ctxOffset is set equal to 3*(log 2TrafoSizeX−2)+((log 2TrafoSizeX−1)>>2)+((1<<log 2TrafoSize)>>6)<<1)+((1<<log 2TrafoSize)>>7) and ctxShift is set equal to <ADD>((log 2TrafoSize+1)>>2)<<1</ADD>.
 Otherwise (cIdx is greater than 0), ctxOffset is set equal to <ADD>19</ADD> and ctxShift is set equal to max(0, log 2TrafoSize−2)−max(0, log 2TrafoSize−4).
The variable ctxInc is derived as follows:

ctxInc=(binIdx>>ctxShift)+ctxOffset    (9-21)

The resulting context entries table is shown below. The altered context indices relative to the example tables above are shown in bold and italics.

TABLE VI

Luma last_significant_coeff_X_prefix
Context assignment (Setting A)

| Bin index | 0 | 1 | 2 | 3 | 4 | 5 | 6 | 7 | 8 |
|---|---|---|---|---|---|---|---|---|---|
| TU 4 × 4 | 0 | 1 | 2 | | | | | | |
| TU 8 × 8 | 3 | 3 | 4 | 4 | 5 | | | | |
| TU 16 × 16 | 6 | 6 | 7 | 7 | 8 | 8 | 9 | | |
| TU 32 × 32 | 10 | 10 | 11 | 11 | 12 | 12 | 13 | 13 | 14 |
| TU 64 × 64 | *15* | *15* | *15* | *15* | *16* | *16* | *16* | *16* | *17* |

As can been seen from above, video encoder 200 and video decoder 300 may be configured to determine contexts for bins of a prefix of a last significant coefficient position syntax element (for both X and Y coordinates) such that bins of the prefix of the last significant coefficient use only three (that is, at most three) separate contexts for 64×64 transform units (or for context coding a coordinate value along a dimension of a transform unit for which the dimension has a size of 64). That is, as shown in Table IV, the only possible contexts for a dimension of size 64 are 15, 16, and 17. Video encoder 200 and video decoder 300 may then entropy code the bins of the prefix of the last significant coefficient position syntax element based on the determined contexts.

In this manner, the number of contexts used according to the techniques of this disclosure may be reduced relative to the number of contexts of, e.g., Table III above. Furthermore, the contexts are non-overlapping for each dimension size. That is, the contexts of dimension sizes 4, 8, 16, 32, and 64 are unique relative to each other. Thus, none of the contexts are shared among different dimension sizes. Accordingly, the techniques of this disclosure may reduce complexity and allow for improved context adaptability for various dimension sizes.

Additionally, the below example of an entropy engine initialization function has been found to be beneficial for the techniques of this disclosure:

```
#define NUM_CTX_SCANR_LUMA       18
#define NUM_CTX_SCANR_CHROMA      3
#define NUM_CTX_SCANR           (NUM_CTX_SCANR_LUMA +
NUM_CTX_SCANR_CHROMA)
init_cc_scan_x [2][NUM_CTX_SCANR] = {
```

-continued

```
{762, 310, 288, 828, 342, 451, 502, 51, 97, 416, 662, 890, 340, 146, 20,
337, 468, 975, 216, 66, 54},
{892, 84, 581, 600, 278, 419, 372, 568, 408, 485, 338, 632, 666, 732, 17,
178, 180, 585, 581, 34, 257} };
init_ init_cc_scan_y [2][NUM_CTX_SCANR] = {
{81, 440, 4, 534, 406, 226, 370, 370, 259, 38, 598, 792, 860, 312, 88,
662, 924, 161, 248, 20, 54},
{470, 376, 323, 276, 602, 52, 340, 600, 376, 378, 598, 502, 730, 538, 17,
195, 504, 378, 320, 160, 572} };
```

Figure 4:
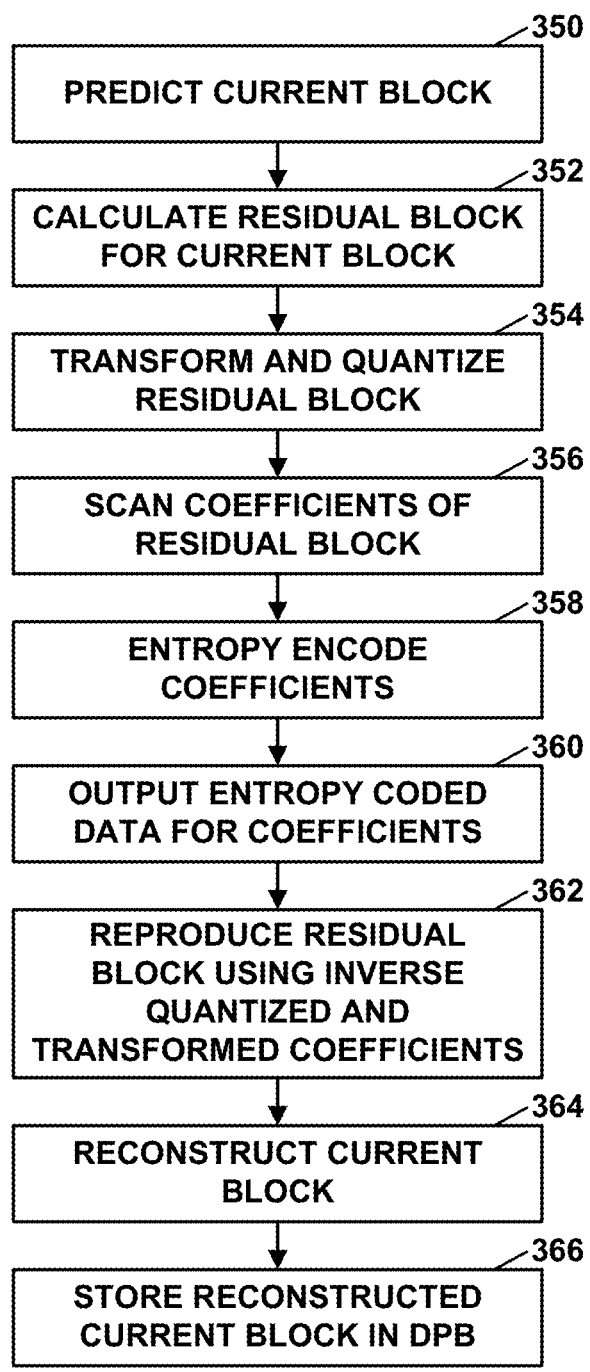
FIG. 4 is a flowchart illustrating an example video encoding process according to the techniques of this disclosure.

FIG. 4 is a flowchart illustrating an example method for encoding a current block. The current block may comprise a current CU. Although described with respect to video encoder 200 (FIGS. 1 and 3), it should be understood that other devices may be configured to perform a method similar to that of FIG. 4.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356).

During the scan, or following the scan, video encoder 200 may entropy encode the transform coefficients (358). For example, video encoder 200 may encode the transform coefficients, e.g., using CAVLC or CABAC. In particular, while encoding the transform coefficients, video encoder 200 may entropy encode, for example, significant coefficient flags and data representing level values and signs for significant (i.e., non-zero) coefficients. Moreover, video encoder 200 may entropy encode data representing a last significant coefficient in scan order, such as x- and y-coordinates of the last significant coefficient, according to the techniques of this disclosure. For example, video encoder 200 may determine contexts for encoding the x- and y-coordinates using respective sizes of corresponding dimensions of the current block, and then entropy encode the x- and y-coordinates using the respective contexts. Video encoder 200 may then output the entropy encoded data for coefficients of the block (360).

Furthermore, video encoder 200 may also reproduce the residual block using inverse quantized and inverse transformed coefficients (362). For example, inverse quantization unit 210 (FIG. 2) may inverse quantize the quantized transform coefficients, and inverse transform processing unit 212 (FIG. 2) may inverse transform the transform coefficients, to reproduce the residual block. Reconstruction unit 214 (FIG. 2) may combine the residual block with the prediction block to reconstruct the current block (264) and store the reconstructed current block (potentially after filtering the reconstructed current block) in DPB 218 (266). Thus, the method of FIG. 4 represents a method of decoding video data as well as encoding video data.

In this manner, the method of FIG. 4 represents an example of a method of encoding video data including determining a size of a dimension of a current block of video data; calculating a context for entropy encoding a last significant coefficient coordinate along the dimension, wherein calculating the context comprises: calculating a context shift value according to ((log 2TrafoSize+1)>>2)<<1, wherein log 2TrafoSize represents a logarithmic value of the size of the dimension, '>>' represents a bitwise right shift operator, and '<<' represents a bitwise left shift operator; and calculating the context using the context shift value; and entropy encoding the last significant coefficient coordinate using the calculated context.

Figure 5:
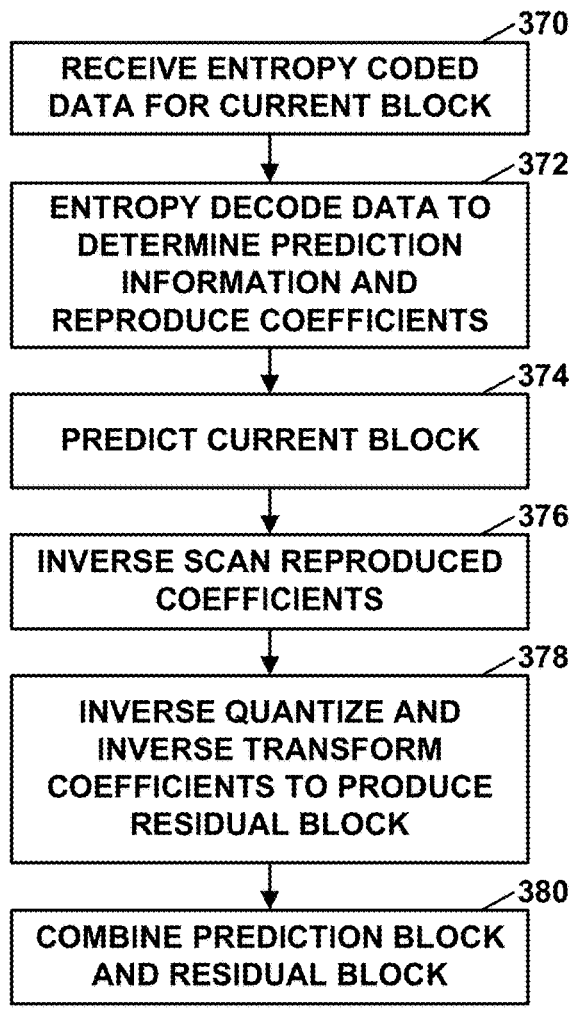
FIG. 5 is a flowchart illustrating an example video decoding process according to the techniques of this disclosure.

FIG. 5 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 5.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). In particular, while decoding the transform coefficients, video decoder 300 may entropy decode, for example, significant coefficient flags and data representing level values and signs for significant (i.e., non-zero) coefficients. Moreover, video decoder 300 may entropy decode data representing a last significant coefficient in scan order, such as x- and y-coordinates of the last significant coefficient, according to the techniques of this disclosure. For example, video decoder 300 may determine contexts for decoding the x- and y-coordinates using respective sizes of corresponding dimensions of the current block, and then entropy decode the x- and y-coordinates using the respective contexts. Video decoder 300 may further avoid entropy decoding data (e.g., significant coefficient flags, sign values, and level values) for coefficients following the last significant coefficient in scan order.

Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

In this manner, the method of FIG. 5 represents an example of a method of decoding video data including determining a size of a dimension of a current block of video data; calculating a context for entropy decoding a last significant coefficient coordinate along the dimension, wherein calculating the context comprises: calculating a context shift value according to ((log 2TrafoSize+1)>>2)<<1, wherein log 2TrafoSize represents a logarithmic value of the size of the dimension, '>>' represents a bitwise right shift operator, and '<<' represents a bitwise left shift operator; and calculating the context using the context shift value; and entropy decoding the last significant coefficient coordinate using the calculated context.

Figure 6:
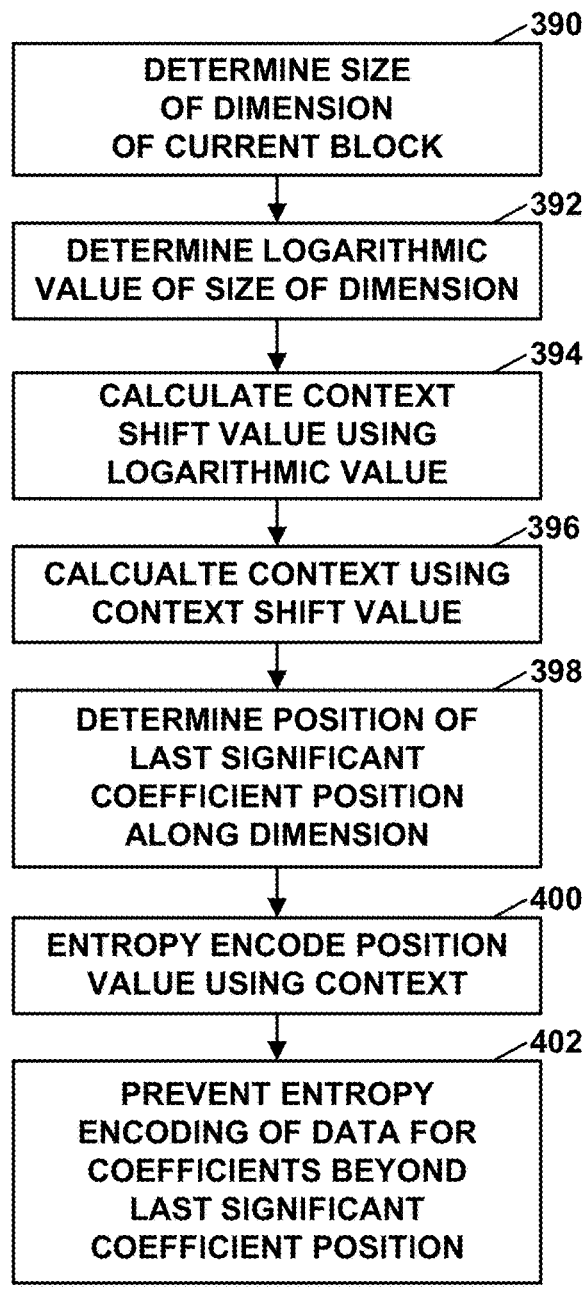
FIG. 6 is a flowchart illustrating an example method of encoding video data according to the techniques of this disclosure.

FIG. 6 is a flowchart illustrating an example method of encoding video data according to the techniques of this disclosure. The method of FIG. 6 is explained as being performed by video encoder 200 of FIGS. 1 and 2, although other devices may be configured to perform this or a similar method. The method of FIG. 6 may correspond to a portion of step 358 of the method of FIG. 4. For example, as explained above, while entropy encoding coefficients, video encoder 200 may entropy encode x- and y-coordinates of a last significant coefficient position of a current block (e.g., a transform block) of video data. The x- and y-coordinates may correspond to a last_sig_coeff_x_prefix value and a last_sig_coeff_y_prefix value, respectively.

When encoding the x- and y-coordinates of a last significant coefficient position, video encoder 200 may determine a size of a corresponding dimension of the current block (e.g., the transform block) (390). For example, for the x-coordinate, video encoder 200 may determine a width of the current block, whereas for the y-coordinate, video encoder 200 may determine a height of the current block. Video encoder 200 may then determine a logarithmic value of the size of the dimension (e.g., log 2TrafoSize) (392). Video encoder 200 may then calculate a context shift value using the logarithmic value (394). For example, video encoder 200 may calculate the context shift value according to ((log 2TrafoSize+1)>>2)<<1, where log 2TrafoSize represents the logarithmic value of the size of the dimension, '>>' represents a bitwise right shift operator, and '<<' represents a bitwise left shift operator.

Video encoder 200 may further calculate a context for entropy encoding the last significant coefficient coordinate along the dimension using the context shift value (396). For example, video encoder 200 may calculate a context increment value (ctxInc) using (binIdx>>ctxShift)+ctxOffset, which may effectively yield the results shown in Table IV above when using the context shift value calculated according to ((log 2TrafoSize+1)>>2)<<1. Video encoder 200 may then apply the context increment value to a previously determined context to update (i.e., adapt) the context for the current value to be entropy encoded (e.g., the current x- or y-coordinate of the last significant coefficient).

Video encoder 200 may also determine the position of the last significant coefficient position along the dimension (398), e.g., the x- or y-coordinate. Video encoder 200 may further entropy encode the position value (that is, the x- or y-coordinate) using the context (400). For example, video encoder 200 may entropy encode the last_sig_coeff_x_prefix or last_sig_coeff_y_prefix using the corresponding, determined context. In particular, video encoder 200 may entropy encode the prefix values using the determined context, but bypass encode the remaining values of the x- and y-coordinates beyond the prefix. Video encoder 200 may perform this process for both the x-coordinate and the y-coordinate. Having signaled a position of the last significant coefficient position in this manner, video encoder 200 may prevent entropy encoding of data for coefficients beyond the last significant coefficient position in scan order (402), e.g., by skipping encoding of significant coefficient flags, sign values, and level values for any coefficients beyond the last significant coefficient in the scan order.

In this manner, the method of FIG. 6 represents an example of a method of encoding video data including determining a size of a dimension of a current block of video data; calculating a context for entropy encoding a last significant coefficient coordinate along the dimension, wherein calculating the context comprises: calculating a context shift value according to ((log 2TrafoSize+1)>>2)<<1, wherein log 2TrafoSize represents a logarithmic value of the size of the dimension, '>>' represents a bitwise right shift operator, and '<<' represents a bitwise left shift operator; and calculating the context using the context shift value; and entropy encoding the last significant coefficient coordinate using the calculated context.

Figure 7:
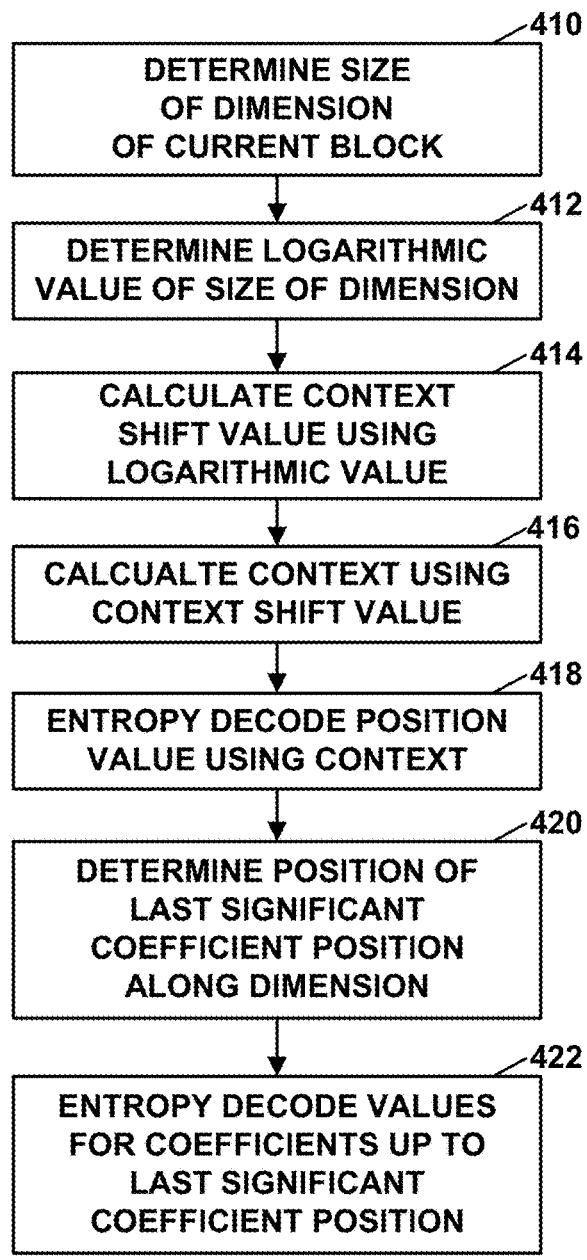
FIG. 7 is a flowchart illustrating an example method of decoding video data according to the techniques of this disclosure.

FIG. 7 is a flowchart illustrating an example method of decoding video data according to the techniques of this disclosure. The method of FIG. 7 is explained as being performed by video decoder 300 of FIGS. 1 and 3, although other devices may be configured to perform this or a similar method. The method of FIG. 7 may correspond to a portion of step 372 of the method of FIG. 5. For example, as explained above, while entropy encoding coefficients, video decoder 300 may entropy decode x- and y-coordinates of a last significant coefficient position of a current block (e.g., a transform block) of video data. The x- and y-coordinates may correspond to a last_sig_coeff_x_prefix value and a last_sig_coeff_y_prefix value, respectively.

When decoding the x- and y-coordinates of a last significant coefficient position, video decoder 300 may determine a size of a corresponding dimension of the current block (e.g., the transform block) (410). For example, for the x-coordinate, video decoder 300 may determine a width of the current block, whereas for the y-coordinate, video decoder 300 may determine a height of the current block. Video decoder 300 may then determine a logarithmic value of the size of the dimension (e.g., log 2TrafoSize) (412). Video decoder 300 may then calculate a context shift value using the logarithmic value (414). For example, video decoder 300 may calculate the context shift value according to ((log 2TrafoSize+1)>>2)<<1, where log 2TrafoSize represents the logarithmic value of the size of the dimension, '>>' represents a bitwise right shift operator, and '<<' represents a bitwise left shift operator.

Video decoder 300 may further calculate a context for entropy decoding the last significant coefficient position along the dimension using the context shift value (416). For example, video decoder 300 may calculate a context increment value (ctxInc) using (binIdx>>ctxShift)+ctxOffset, which may effectively yield the results shown in Table IV above when using the context shift value calculated according to ((log 2TrafoSize+1)>>2)<<1. Video decoder 300 may then apply the context increment value to a previously determined context to update (i.e., adapt) the context for the current value to be entropy decoded (e.g., the current x- or y-coordinate of the last significant coefficient).

Video decoder 300 may then entropy decode the position value (that is, the x- or y-coordinate) using the context (418). For example, video decoder 300 may entropy decode the last_sig_coeff_x_prefix or last_sig_coeff_y_prefix using the corresponding, determined context. In particular, video decoder 300 may entropy decode the prefix values using the determined context, but bypass decode the remaining values of the x- and y-coordinates beyond the prefix. Video decoder 300 may perform this process for both the x-coordinate and the y-coordinate. Video decoder 300 may determine the x- and y-coordinates of the last significant coefficient from the corresponding decoded position values (420). For example, video decoder 300 may concatenate the decoded prefix and remaining (suffix) values. Having determined the position of the last significant coefficient position in this manner, video decoder 300 may entropy decode values for coefficients up to the last significant coefficient position in scan order (422) and prevent (e.g., skip) decoding of significant coefficient flags, sign values, and level values for any coefficients beyond the last significant coefficient in the scan order.

In this manner, the method of FIG. 7 represents an example of a method of decoding video data including determining a size of a dimension of a current block of video data; calculating a context for entropy decoding a last significant coefficient coordinate along the dimension, wherein calculating the context comprises: calculating a context shift value according to ((log 2TrafoSize+1)>>2) <<1, wherein log 2TrafoSize represents a logarithmic value of the size of the dimension, '>>' represents a bitwise right shift operator, and '<<' represents a bitwise left shift operator; and calculating the context using the context shift value; and entropy decoding the last significant coefficient coordinate using the calculated context.

Figure 8:
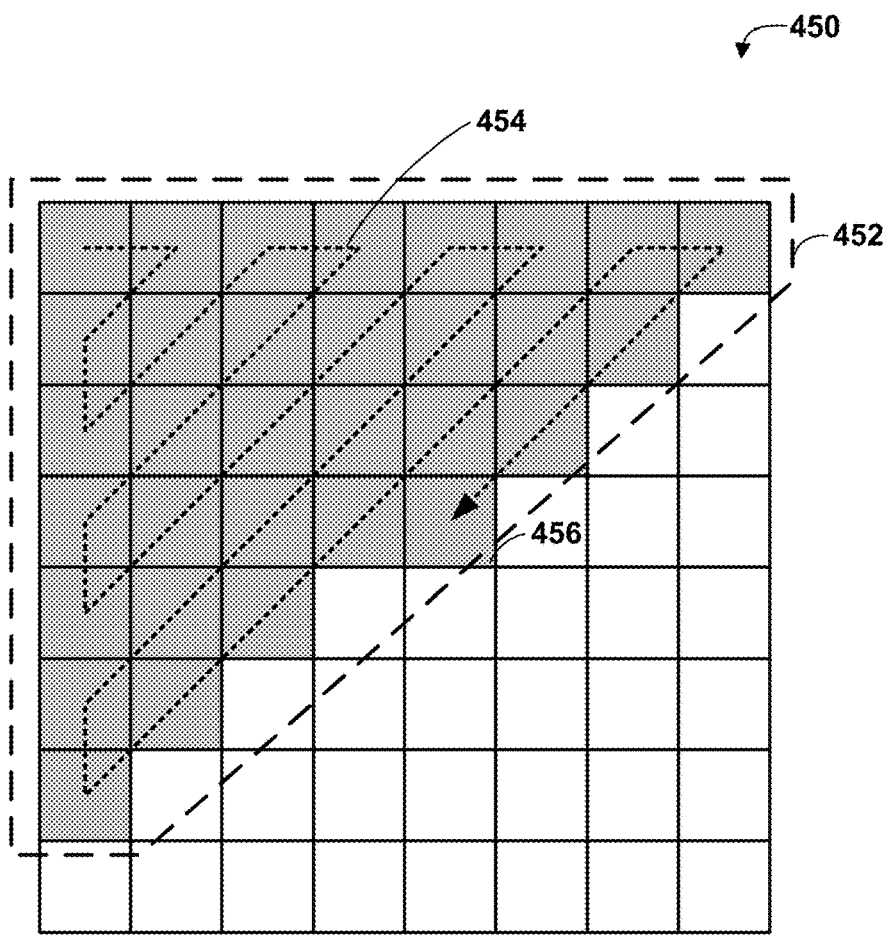
FIG. 8 is a conceptual diagram illustrating an example block of video data that may be coded (encoded or decoded) using the techniques of this disclosure.

FIG. 8 is a conceptual diagram illustrating an example block 450 of video data that may be coded (encoded or decoded) using the techniques of this disclosure. In this example, block 450 is an 8×8 block that includes 64 transform coefficients, although blocks of various sizes may be processed in a similar manner. In the example of FIG. 8, the transform coefficients are processed according to scan order 454, which in this example is a zig-zag scan. Block 450 includes last significant coefficient 456 in scan order 454, in this example. Thus, video encoder 200 and video decoder 300 may entropy code data for transform coefficients 452 (which are shaded gray in this example), and prevent entropy coding of data for the remaining transform coefficients in scan order 454 beyond last significant coefficient 456 (which are shaded white in this example).

According to the techniques of this disclosure, video encoder 200 may determine that an x-coordinate of last significant coefficient 456 is at position 4 (assuming coefficients are zero-indexed), and that a y-coordinate of last significant coefficient 456 is at position 3. Furthermore, video encoder 200 may determine that a width of block 450 is 8, and that a height of block 450 is also 8. Thus, video encoder 200 may use the width and height of block 450 to determine respective logarithmic values of the width and the height, then use these logarithmic values to determine respective context shift values. Video encoder 200 may further determine respective context values using the context shift values to entropy encode the x- and y-coordinates of last significant coefficient 456.

Figure 9:
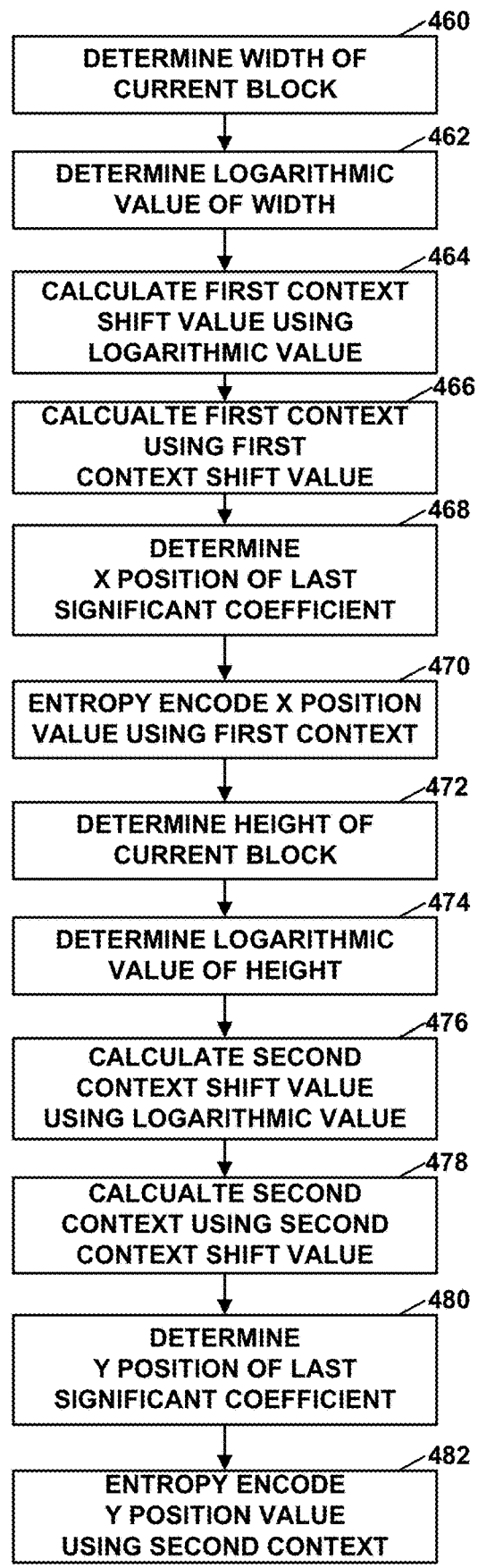
FIG. 9 is a flowchart illustrating another example method of encoding video data according to the techniques of this disclosure.

FIG. 9 is a flowchart illustrating another example method of encoding video data according to the techniques of this disclosure. The method of FIG. 9 is explained as being performed by video encoder 200 of FIGS. 1 and 2, although other devices may be configured to perform this or a similar method. The method of FIG. 9 may correspond to a portion of step 358 of the method of FIG. 4. For example, as explained above, while entropy encoding coefficients, video encoder 200 may entropy encode x- and y-coordinates of a last significant coefficient position of a current block (e.g., a transform block) of video data. The x- and y-coordinates may correspond to a last_sig_coeff_x_prefix value and a last_sig_coeff_y_prefix value, respectively.

In this example, video encoder 200 may initially determine a width of a current block (e.g., a transform block) of video data (460). Video encoder 200 may then determine a logarithmic value of the width (e.g., log 2TrafoSize) (462). Video encoder 200 may then calculate a first context shift value using the logarithmic value (464). For example, video encoder 200 may calculate the first context shift value according to ((log 2TrafoSize+1)>>2)<<1, where log 2TrafoSize represents the logarithmic value of the width, '>>' represents a bitwise right shift operator, and '<<' represents a bitwise left shift operator.

Video encoder 200 may further calculate a first context for entropy encoding the x-coordinate of the last significant coefficient using the first context shift value (466). For example, video encoder 200 may calculate a context increment value (ctxInc) using (binIdx>>ctxShift)+ctxOffset, which may effectively yield the results shown in Table IV above when using the context shift value calculated according to ((log 2TrafoSize+1)>>2)<<1. Video encoder 200 may then apply the context increment value to a previously determined context to update (i.e., adapt) the context for the current value to be entropy encoded (e.g., the x-coordinate of the last significant coefficient).

Video encoder 200 may then determine the x-position (i.e., the x-coordinate) of the last significant coefficient along the width (468). Video encoder 200 may further entropy encode the x-position value (that is, the x-coordinate) using the first context (470). For example, video encoder 200 may entropy encode the last_sig_coeff_x_prefix using the first context. In particular, video encoder 200 may entropy encode the prefix of the x-coordinate of the last significant coefficient using the first context, and bypass encode the remaining (suffix) bins of the x-coordinate.

Video encoder 200 may also determine a height of the current block (472). Video encoder 200 may then determine a logarithmic value of the height (e.g., log 2TrafoSize) (474). Video encoder 200 may then calculate a second context shift value using the logarithmic value (476). For example, video encoder 200 may calculate the second context shift value according to ((log 2TrafoSize+1)>>2)<<1, where log 2TrafoSize represents the logarithmic value of the height, '>>' represents a bitwise right shift operator, and '<<' represents a bitwise left shift operator.

Video encoder 200 may further calculate a second context for entropy encoding the y-coordinate of the last significant coefficient using the first context shift value (478). For example, video encoder 200 may calculate a context increment value (ctxInc) using (binIdx>>ctxShift)+ctxOffset, which may effectively yield the results shown in Table IV above when using the context shift value calculated according to ((log 2TrafoSize+1)>>2)<<1. Video encoder 200 may then apply the context increment value to a previously determined context to update (i.e., adapt) the context for the current value to be entropy encoded (e.g., the y-coordinate of the last significant coefficient).

Video encoder 200 may then determine the y-position (i.e., the y-coordinate) of the last significant coefficient along the height (480). Video encoder 200 may further entropy encode the y-position value (that is, the y-coordinate) using the second context (482). For example, video encoder 200 may entropy encode the last_sig_coeff_y_prefix using the second context. In particular, video encoder 200 may entropy encode the prefix of the y-coordinate of the last significant coefficient using the first context, and bypass encode the remaining (suffix) bins of the y-coordinate.

In this manner, the method of FIG. 9 represents an example of a method of encoding video data including determining a size of a dimension of a current block of video data; calculating a context for entropy encoding a last significant coefficient coordinate along the dimension, wherein calculating the context comprises: calculating a context shift value according to ((log 2TrafoSize+1)>>2)<<1, wherein log 2TrafoSize represents a logarithmic value of the size of the dimension, '>>' represents a bitwise right shift operator, and '<<' represents a bitwise left shift operator; and calculating the context using the context shift value; and entropy encoding the last significant coefficient coordinate using the calculated context.

Figure 10:
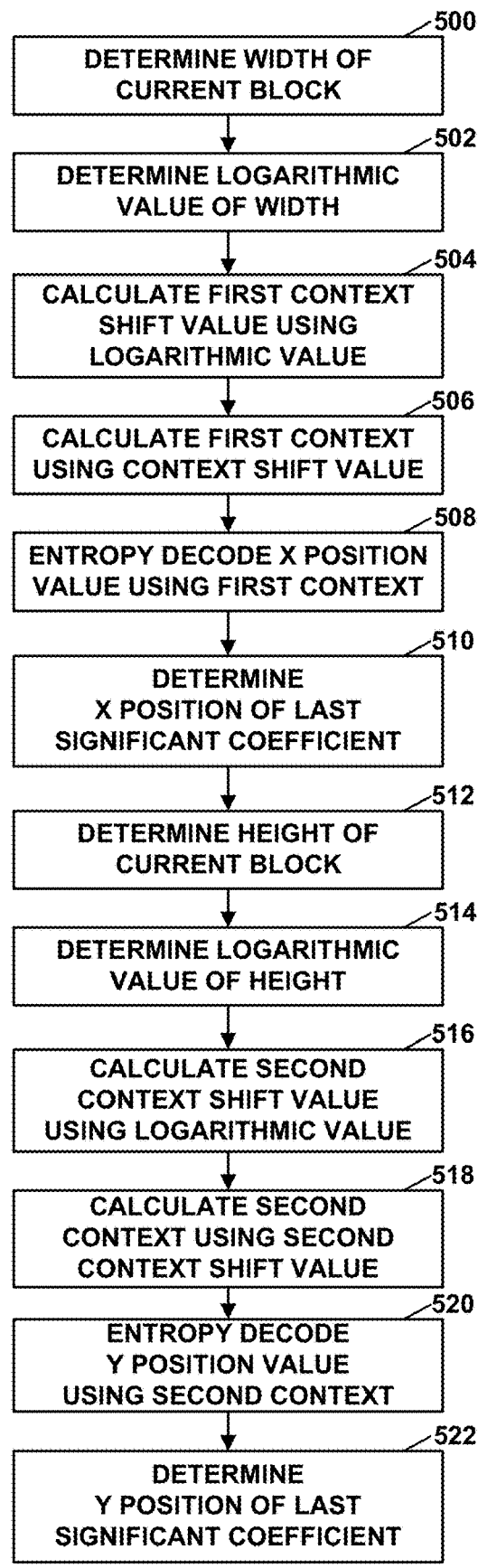
FIG. 10 is a flowchart illustrating another example method of decoding video data according to the techniques of this disclosure.

FIG. 10 is a flowchart illustrating another example method of decoding video data according to the techniques of this disclosure. The method of FIG. 10 is explained as being performed by video decoder 300 of FIGS. 1 and 3, although other devices may be configured to perform this or a similar method. The method of FIG. 10 may correspond to a portion of step 372 of the method of FIG. 5. For example, as explained above, while entropy decoding coefficients, video decoder 300 may entropy decode x- and y-coordinates of a last significant coefficient position of a current block (e.g., a transform block) of video data. The x- and y-coordinates may correspond to a last_sig_coeff_x_prefix value and a last_sig_coeff_y_prefix value, respectively.

In this example, video decoder 300 may initially determine a width of a current block (e.g., a transform block) of video data (500). Video decoder 300 may then determine a logarithmic value of the width (e.g., log 2TrafoSize) (502). Video decoder 300 may then calculate a first context shift value using the logarithmic value (504). For example, video decoder 300 may calculate the first context shift value according to ((log 2TrafoSize+1)>>2)<<1, where log 2TrafoSize represents the logarithmic value of the width, '>>' represents a bitwise right shift operator, and '<<' represents a bitwise left shift operator.

Video decoder 300 may further calculate a first context for entropy decoding the x-coordinate of the last significant coefficient using the first context shift value (506). For example, video decoder 300 may calculate a context increment value (ctxInc) using (binIdx>>ctxShift)+ctxOffset, which may effectively yield the results shown in Table IV above when using the context shift value calculated according to ((log 2TrafoSize+1)>>2)<<1. Video decoder 300 may then apply the context increment value to a previously determined context to update (i.e., adapt) the context for the current value to be entropy decoded (e.g., the x-coordinate of the last significant coefficient).

Video decoder 300 may then entropy decode the x-position value (that is, the x-coordinate) using the first context (508). For example, video decoder 300 may entropy decode the last_sig_coeff_x_prefix using the first context. Video decoder 300 may also bypass decode remaining (suffix) bins of the x-coordinate. Video decoder 300 may then determine the x-position (i.e., the x-coordinate) of the last significant coefficient along the width from the decoded x-position value (510). For example, video decoder 300 may concatenate the prefix with the remaining (suffix) bins to determine the x-coordinate of the last significant coefficient.

Video decoder 300 may also determine a height of the current block (512). Video decoder 300 may then determine a logarithmic value of the height (e.g., log 2TrafoSize) (514). Video decoder 300 may then calculate a second context shift value using the logarithmic value (516). For example, video decoder 300 may calculate the second context shift value according to ((log 2TrafoSize+1)>>2)<<1, where log 2TrafoSize represents the logarithmic value of the height, '>>' represents a bitwise right shift operator, and '<<' represents a bitwise left shift operator.

Video decoder 300 may further calculate a second context for entropy decoding the y-coordinate of the last significant coefficient using the first context shift value (518). For example, video decoder 300 may calculate a context increment value (ctxInc) using (binIdx>>ctxShift)+ctxOffset, which may effectively yield the results shown in Table IV above when using the context shift value calculated according to ((log 2TrafoSize+1)>>2)<<1. Video decoder 300 may then apply the context increment value to a previously determined context to update (i.e., adapt) the context for the current value to be entropy decoded (e.g., the y-coordinate of the last significant coefficient).

Video decoder 300 may then entropy decode the y-position value (that is, the y-coordinate) using the second context (520). For example, video decoder 300 may entropy decode the last_sig_coeff_y_prefix using the second context. Video decoder 300 may also bypass decode remaining (suffix) bins of the y-coordinate. Video decoder 300 may then determine the y-position (i.e., the y-coordinate) of the last significant coefficient along the height from the entropy decoded y-position value (522). For example, video decoder 300 may concatenate the prefix with the remaining (suffix) bins to determine the y-coordinate of the last significant coefficient.

In this manner, the method of FIG. 10 represents an example of a method of decoding video data including determining a size of a dimension of a current block of video data; calculating a context for entropy decoding a last significant coefficient coordinate along the dimension, wherein calculating the context comprises: calculating a context shift value according to ((log 2TrafoSize+1)>>2) <<1, wherein log 2TrafoSize represents a logarithmic value of the size of the dimension, '>>' represents a bitwise right shift operator, and '<<' represents a bitwise left shift operator; and calculating the context using the context shift value; and entropy decoding the last significant coefficient coordinate using the calculated context.

Certain techniques of this disclosure are summarized in the following clauses:

Clause 1: A method of coding video data, the method comprising: determining contexts for bins of a prefix of a last significant coefficient position syntax element for a 64×64 transform unit, wherein a total number of contexts for the bins of the prefix includes only three separate contexts; and entropy coding the bins of the prefix of the last significant coefficient position syntax element based on the determined contexts.

Clause 2: The method of clause 1, wherein the prefix of the last significant coefficient position syntax element is for an X coordinate or for a Y coordinate.

Clause 3: The method of any of clauses 1-2, wherein coding comprises decoding.

Clause 4: The method of any of clauses 1-3, wherein coding comprises encoding.

Clause 5: A device for coding video data, the device comprising one or more means for performing the method of any of clauses 1-4.

Clause 6: The device of clause 5, wherein the one or more means comprise one or more processors implemented in circuitry.

Clause 7: The device of any of clauses 5 and 6, further comprising a memory to store the video data.

Clause 8: The device of any of clauses 5-7, further comprising a display configured to display decoded video data.

Clause 9: The device of any of clauses 5-8, wherein the device comprises one or more of a camera, a computer, a mobile device, a broadcast receiver device, or a set-top box.

Clause 10: The device of any of clauses 5-9, wherein the device comprises a video decoder.

Clause 11: The device of any of clauses 5-10, wherein the device comprises a video encoder.

Clause 12: A computer-readable storage medium having stored thereon instructions that, when executed, cause one or more processors to perform the method of any of clauses 1-4.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or

What is claimed is:

1. A method of coding video data, the method comprising: determining a size of a dimension of a current block of video data; calculating a context for entropy coding a last significant coefficient coordinate along the dimension, wherein calculating the context comprises: calculating a context shift value using ((log 2TrafoSize+1)>>2)<<1, wherein log 2TrafoSize represents a logarithmic value of the size of the dimension, '>>' represents a bitwise right shift operator, and '<<' represents a bitwise left shift operator; and calculating the context using the context shift value; and entropy coding the last significant coefficient coordinate using the calculated context.

2. The method of claim 1, wherein the dimension of the current block comprises a width of the current block, and the last significant coefficient coordinate comprises an X-coordinate of a position of a last significant coefficient in the current block along a scan order.

3. The method of claim 2, wherein the context comprises a first context, and wherein the context shift value comprises a first context shift value, the method further comprising:
determining a height of the current block;
calculating a second context for entropy coding a Y-coordinate of the position of the last significant coefficient, wherein calculating the second context comprises:
calculating a second context shift value according to ((log 2TrafoHeight+1)>>2)<<1, wherein log 2TrafoHeight represents a logarithmic value of the height of the current block; and
calculating the second context using the second context shift value; and
entropy coding the Y-coordinate of the position of the last significant coefficient using the calculated second context.

4. The method of claim 1, wherein the dimension of the current block comprises a height of the current block, and the last significant coefficient coordinate comprises a Y-coordinate of a position of a last significant coefficient in the current block along a scan order.

5. The method of claim 4, wherein the context comprises a first context, and wherein the context shift value comprises a first context shift value, the method further comprising:
determining a width of the current block;
calculating a second context for entropy coding an X-coordinate of the position of the last significant coefficient, wherein calculating the second context comprises:
calculating a second context shift value according to ((log 2TrafoWidth+1)>>2)<<1, wherein log 2TrafoWidth represents a logarithmic value of the width of the current block; and
calculating the second context using the second context shift value; and
entropy coding the X-coordinate of the position of the last significant coefficient using the calculated second context.

6. The method of claim 1,
wherein calculating the context comprises:
calculating a context increment value for a current bin of a prefix of the last significant coefficient coordinate using (binIdx>>ctxShift)+ctxOffset, wherein binIdx represents a position of the current bin in the prefix, ctxShift represents the context shift value, and ctxOffset represents a context offset value; and
determining the context for the current bin using the context increment value for the current bin, and
wherein entropy coding the last significant coefficient coordinate comprises entropy coding the current bin using the context for the current bin.

7. The method of claim 1, wherein when the size of the dimension is 64, calculating the context comprises calculating one of at most three possible contexts.

8. The method of claim 1, wherein coding comprises decoding.

9. The method of claim 1, wherein coding comprises encoding.

10. A device for coding video data, the device comprising: a memory configured to store video data; and one or more processors implemented in circuitry and configured to: determine a size of a dimension of a current block of the video data; calculate a context for entropy coding a last significant coefficient coordinate along the dimension, wherein to calculate the context, the one or more processors are configured to: calculate a context shift value using ((log 2TrafoSize+1)>>2)<<1, wherein log 2TrafoSize represents a logarithmic value of the size of the dimension, '>>' represents a bitwise right shift operator, and '<<' represents a bitwise left shift operator; and calculate the context using the context shift value; and entropy code the last significant coefficient coordinate using the calculated context.

11. The device of claim 10, wherein the dimension of the current block comprises a width of the current block and the last significant coefficient coordinate comprises an X-coordinate of a position of a last significant coefficient in the current block along a scan order.

12. The device of claim 11, wherein the context comprises a first context, wherein the context shift value comprises a first context shift value, and wherein the one or more processors are further configured to:
determine a height of the current block;
calculate a second context for entropy coding a Y-coordinate of the position of the last significant coefficient, wherein to calculate the second context, the one or more processors are configured to:
calculate a second context shift value according to ((log 2TrafoHeight+1)>>2)<<1, wherein log 2TrafoHeight represents a logarithmic value of the height of the current block; and
calculate the second context using the second context shift value; and
entropy code the Y-coordinate of the position of the last significant coefficient using the calculated second context.

13. The device of claim 10, wherein the dimension of the current block comprises a height of the current block and the last significant coefficient coordinate comprises a Y-coordinate of a position of a last significant coefficient in the current block along a scan order.

14. The device of claim 13, wherein the context comprises a first context, wherein the context shift value comprises a first context shift value, and wherein the one or more processors are further configured to:
determine a width of the current block;
calculate a second context for entropy coding an X-coordinate of the position of the last significant coefficient, wherein to calculate the second context, the one or more processors are configured to:

calculate a second context shift value according to ((log 2TrafoWidth+1)>>2)<<1, wherein log 2TrafoWidth represents a logarithmic value of the width of the current block; and calculate the second context using the second context shift value; and entropy code the X-coordinate of the position of the last significant coefficient using the calculated second context.

15. The device of claim 10, wherein to calculate the context, the one or more processors are configured to:

calculate a context increment value for a current bin of a prefix of the last significant coefficient coordinate using (binIdx>>ctxShift)+ctxOffset, wherein binIdx represents a position of the current bin in the prefix, ctxShift represents the context shift value, and ctxOffset represents a context offset value; and determine the context for the current bin using the context increment value for the current bin, and wherein to entropy code the last significant coefficient coordinate, the one or more processors are configured to entropy code the current bin using the context for the current bin.

16. The device of claim 10, wherein when the size of the dimension is 64, the one or more processors are configured to determine that the context is one of at most three possible contexts.

17. The device of claim 10, further comprising a display configured to display the coded video data.

18. The device of claim 10, wherein the device comprises one or more of a camera, a computer, a mobile device, a broadcast receiver device, or a set-top box.

19. A non-transitory computer-readable storage medium having stored thereon instructions that, when executed, cause a processor to: determine a size of a dimension of a current block of video data; calculate a context for entropy coding a last significant coefficient coordinate along the dimension, wherein the instructions that cause the processor to calculate the context comprise instructions that cause the processor to calculate a context shift value using ((log 2TrafoSize+1)>>2)<<1, wherein log 2TrafoSize represents a logarithmic value of the size of the dimension, '>' represents a bitwise right shift operator, and '<<' represents a bitwise left shift operator; and calculate the context using the context shift value; and entropy code the last significant coefficient coordinate using the calculated context.

20. The non-transitory computer-readable storage medium of claim 19, wherein the dimension of the current block comprises a width of the current block, and the last significant coefficient coordinate comprises an X-coordinate of a position of a last significant coefficient in the current block along a scan order.

21. The non-transitory computer-readable storage medium of claim 20, wherein the context comprises a first context, and wherein the context shift value comprises a first context shift value, further comprising instructions that cause the processor to:

determine a height of the current block;

calculate a second context for entropy coding a Y-coordinate of the position of the last significant coefficient, wherein the instructions that cause the processor to calculate the second context comprise instructions that cause the processor to:

calculate a second context shift value according to ((log 2TrafoHeight+1)>>2)<<1, wherein log 2TrafoHeight represents a logarithmic value of the height of the current block; and calculate the second context using the second context shift value; and entropy code the Y-coordinate of the position of the last significant coefficient using the calculated second context.

22. The non-transitory computer-readable storage medium of claim 19, wherein the dimension of the current block comprises a height of the current block, and the last significant coefficient coordinate comprises a Y-coordinate of a position of a last significant coefficient in the current block along a scan order.

23. The non-transitory computer-readable storage medium of claim 22, wherein the context comprises a first context, and wherein the context shift value comprises a first context shift value, further comprising instructions that cause the processor to:

determine a width of the current block;

calculate a second context for entropy coding an X-coordinate of the position of the last significant coefficient, wherein the instructions that cause the processor to calculate the second context comprise instructions that cause the processor to:

calculate a second context shift value according to ((log 2TrafoWidth+1)>>2)<<1, wherein log 2TrafoWidth represents a logarithmic value of the width of the current block; and calculate the second context using the second context shift value; and entropy code the X-coordinate of the position of the last significant coefficient using the calculated second context.

24. The non-transitory computer-readable storage medium of claim 19, wherein the instructions that cause the processor to calculate the context comprise instructions that cause the processor to:

calculate a context increment value for a current bin of a prefix of the last significant coefficient coordinate using (binIdx>>ctxShift)+ctxOffset, wherein binIdx represents a position of the current bin in the prefix, ctxShift represents the context shift value, and ctxOffset represents a context offset value; and determine the context for the current bin using the context increment value for the current bin, and wherein the instructions that cause the processor to entropy code the last significant coefficient coordinate comprise instructions that cause the processor to entropy code the current bin using the context for the current bin.

25. The non-transitory computer-readable storage medium of claim 19, wherein the instructions that cause the processor to calculating the context comprise instructions that cause the processor to, when the size of the dimension is 64, determine the context as being one of at most three possible contexts.

26. A method of encoding video data, the method comprising: determining a size of a dimension of a current block of video data; calculating a context for entropy encoding a last significant coefficient coordinate along the dimension, wherein calculating the context comprises: calculating a context shift value using ((log 2TrafoSize+1)>>2)<<1, wherein log 2TrafoSize represents a logarithmic value of the size of the dimension, '>' represents a bitwise right shift operator, and '<<' represents a bitwise left shift operator; and calculating the context using the context shift value; and entropy encoding the last significant coefficient coordinate using the calculated context.

27. The method of claim 26, wherein the dimension of the current block comprises a width of the current block, and the last significant coefficient coordinate comprises an X-coordinate of a position of a last significant coefficient in the current block along a scan order.

28. The method of claim 27, wherein the context comprises a first context, and wherein the context shift value comprises a first context shift value, the method further comprising:
determining a height of the current block;
calculating a second context for entropy encoding a Y-coordinate of the position of the last significant coefficient, wherein calculating the second context comprises:
calculating a second context shift value according to ((log 2TrafoHeight+1)>>2)<<1, wherein log 2TrafoHeight represents a logarithmic value of the height of the current block; and
calculating the second context using the second context shift value; and
entropy encoding the Y-coordinate of the position of the last significant coefficient using the calculated second context.

29. The method of claim 26, wherein the dimension of the current block comprises a height of the current block, and the last significant coefficient coordinate comprises a Y-coordinate of a position of a last significant coefficient in the current block along a scan order.

30. The method of claim 29, wherein the context comprises a first context, and wherein the context shift value comprises a first context shift value, the method further comprising:
determining a width of the current block;
calculating a second context for entropy encoding an X-coordinate of the position of the last significant coefficient, wherein calculating the second context comprises:
calculating a second context shift value according to ((log 2TrafoWidth+1)>>2)<<1, wherein log 2TrafoWidth represents a logarithmic value of the width of the current block; and
calculating the second context using the second context shift value; and
entropy encoding the X-coordinate of the position of the last significant coefficient using the calculated second context.

31. The method of claim 26,
wherein calculating the context comprises:
calculating a context increment value for a current bin of a prefix of the last significant coefficient coordinate using (binIdx>>ctxShift)+ctxOffset, wherein binIdx represents a position of the current bin in the prefix, ctxShift represents the context shift value, and ctxOffset represents a context offset value; and
determining the context for the current bin using the context increment value for the current bin, and
wherein entropy encoding the last significant coefficient coordinate comprises entropy encoding the current bin using the context for the current bin.

32. The method of claim 26, wherein when the size of the dimension is 64, calculating the context comprises calculating one of at most three possible contexts.

33. A device for encoding video data, the device comprising: a memory configured to store video data; and one or more processors implemented in circuitry and configured to: determine a size of a dimension of a current block of the video data; calculate a context for entropy encoding a last significant coefficient coordinate along the dimension, wherein to calculate the context, the one or more processors are configured to: calculate a context shift value using ((log 2TrafoSize+1)>>2)<<1, wherein log 2TrafoSize represents a logarithmic value of the size of the dimension, '>>' represents a bitwise right shift operator, and '<<' represents a bitwise left shift operator; and calculate the context using the context shift value; and entropy encode the last significant coefficient coordinate using the calculated context.

34. The device of claim 33, wherein the dimension of the current block comprises a width of the current block and the last significant coefficient coordinate comprises an X-coordinate of a position of a last significant coefficient in the current block along a scan order.

35. The device of claim 34, wherein the context comprises a first context, wherein the context shift value comprises a first context shift value, and wherein the one or more processors are further configured to:
determine a height of the current block;
calculate a second context for entropy encoding a Y-coordinate of the position of the last significant coefficient, wherein to calculate the second context, the one or more processors are configured to:
calculate a second context shift value according to ((log 2TrafoHeight+1)>>2)<<1, wherein log 2TrafoHeight represents a logarithmic value of the height of the current block; and
calculate the second context using the second context shift value; and
entropy encode the Y-coordinate of the position of the last significant coefficient using the calculated second context.

36. The device of claim 33, wherein the dimension of the current block comprises a height of the current block and the last significant coefficient coordinate comprises a Y-coordinate of a position of a last significant coefficient in the current block along a scan order.

37. The device of claim 36, wherein the context comprises a first context, wherein the context shift value comprises a first context shift value, and wherein the one or more processors are further configured to:
determine a width of the current block;
calculate a second context for entropy encoding an X-coordinate of the position of the last significant coefficient, wherein to calculate the second context, the one or more processors are configured to:
calculate a second context shift value according to ((log 2TrafoWidth+1)>>2)<<1, wherein log 2TrafoWidth represents a logarithmic value of the width of the current block; and
calculate the second context using the second context shift value; and
entropy encode the X-coordinate of the position of the last significant coefficient using the calculated second context.

38. The device of claim 33,
wherein to calculate the context, the one or more processors are configured to:
calculate a context increment value for a current bin of a prefix of the last significant coefficient coordinate using (binIdx>>ctxShift)+ctxOffset, wherein binIdx represents a position of the current bin in the prefix, ctxShift represents the context shift value, and ctxOffset represents a context offset value; and determine the context for the current bin using the context increment value for the current bin, and wherein to entropy encode the last significant coefficient coordinate, the one or more processors are configured to entropy encode the current bin using the context for the current bin.

39. The device of claim 33, wherein when the size of the dimension is 64, the one or more processors are configured to determine that the context is one of at most three possible contexts.

40. The device of claim 33, wherein the device comprises one or more of a camera, a computer, a mobile device, or a broadcasting device.

41. A non-transitory computer-readable storage medium having stored thereon instructions that, when executed, cause a processor to: determine a size of a dimension of a current block of video data; calculate a context for entropy encoding a last significant coefficient coordinate along the dimension, wherein the instructions that cause the processor to calculate the context comprise instructions that cause the processor to calculate a context shift value using ((log 2TrafoSize+1)>>2)<<1, wherein log 2TrafoSize represents a logarithmic value of the size of the dimension, '>' represents a bitwise right shift operator, and '<<' represents a bitwise left shift operator; and calculate the context using the context shift value; and entropy encode the last significant coefficient coordinate using the calculated context.

42. The non-transitory computer-readable storage medium of claim 41, wherein the dimension of the current block comprises a width of the current block, and the last significant coefficient coordinate comprises an X-coordinate of a position of a last significant coefficient in the current block along a scan order.

43. The non-transitory computer-readable storage medium of claim 42, wherein the context comprises a first context, and wherein the context shift value comprises a first context shift value, further comprising instructions that cause the processor to:

determine a height of the current block;

calculate a second context for entropy encoding a Y-coordinate of the position of the last significant coefficient, wherein the instructions that cause the processor to calculate the second context comprise instructions that cause the processor to:

calculate a second context shift value according to ((log 2TrafoHeight+1)>>2)<<1, wherein log 2TrafoHeight represents a logarithmic value of the height of the current block; and calculate the second context using the second context shift value; and entropy encode the Y-coordinate of the position of the last significant coefficient using the calculated second context.

44. The non-transitory computer-readable storage medium of claim 41, wherein the dimension of the current block comprises a height of the current block, and the last significant coefficient coordinate comprises a Y-coordinate of a position of a last significant coefficient in the current block along a scan order.

45. The non-transitory computer-readable storage medium of claim 44, wherein the context comprises a first context, and wherein the context shift value comprises a first context shift value, further comprising instructions that cause the processor to:

determine a width of the current block;

calculate a second context for entropy encoding an X-coordinate of the position of the last significant coefficient, wherein the instructions that cause the processor to calculate the second context comprise instructions that cause the processor to:

calculate a second context shift value according to ((log 2TrafoWidth+1)>>2)<<1, wherein log 2TrafoWidth represents a logarithmic value of the width of the current block; and calculate the second context using the second context shift value; and entropy encode the X-coordinate of the position of the last significant coefficient using the calculated second context.

46. The non-transitory computer-readable storage medium of claim 41, wherein the instructions that cause the processor to calculate the context comprise instructions that cause the processor to:

calculate a context increment value for a current bin of a prefix of the last significant coefficient coordinate using (binIdx>>ctxShift)+ctxOffset, wherein binIdx represents a position of the current bin in the prefix, ctxShift represents the context shift value, and ctxOffset represents a context offset value; and determine the context for the current bin using the context increment value for the current bin, and wherein the instructions that cause the processor to entropy encode the last significant coefficient coordinate comprise instructions that cause the processor to entropy encode the current bin using the context for the current bin.

47. The non-transitory computer-readable storage medium of claim 41, wherein the instructions that cause the processor to calculating the context comprise instructions that cause the processor to, when the size of the dimension is 64, determine the context as being one of at most three possible contexts.

* * * * *